US011132730B2

(12) United States Patent
Cao

(10) Patent No.: US 11,132,730 B2
(45) Date of Patent: *Sep. 28, 2021

(54) SYSTEM AND METHOD FOR IMAGE BASED VIEWING AND ORDERING

(71) Applicant: Laura Cao, New York, NY (US)

(72) Inventor: Laura Cao, New York, NY (US)

( * ) Notice: Subject to any disclaimer, the term of this patent is extended or adjusted under 35 U.S.C. 154(b) by 74 days.

This patent is subject to a terminal disclaimer.

(21) Appl. No.: 16/556,550

(22) Filed: Aug. 30, 2019

(65) Prior Publication Data

US 2019/0385209 A1 Dec. 19, 2019

Related U.S. Application Data

(63) Continuation of application No. 15/200,158, filed on Jul. 1, 2016, now Pat. No. 10,497,040, which is a
(Continued)

(51) Int. Cl.
*G06Q 30/06* (2012.01)
*G06Q 20/14* (2012.01)
(Continued)

(52) U.S. Cl.
CPC ....... *G06Q 30/0625* (2013.01); *G06F 16/951* (2019.01); *G06Q 20/102* (2013.01);
(Continued)

(58) Field of Classification Search
CPC ............................................. G06Q 30/06–08
See application file for complete search history.

(56) References Cited

U.S. PATENT DOCUMENTS 6,914,582 B2 7/2005 Tanaka
9,031,867 B1 5/2015 Crawford
(Continued)

FOREIGN PATENT DOCUMENTS

WO WO 2014/033559 A1 3/2014

OTHER PUBLICATIONS

International Search Report and Written Opinion for International Application No. PCT/US2015/065184 dated Mar. 29, 2016.
(Continued)

*Primary Examiner* — Ming Shui
(74) *Attorney, Agent, or Firm* — Wolf, Greenfield & Sacks, P.C.

(57) ABSTRACT

Various aspects and embodiments are directed to image based viewing and/or ordering food items. According to some embodiments, an ordering system for managing image based menus includes a suite of data management applications for providers and/or deliverers (e.g., businesses in the restaurant or food and beverage industry, delivery service providers, etc.). These providers can subscribe to the system in order to access the functionality provided by image based displays including ordering and reservation capabilities provided. In some embodiments, the suite of data management applications can be configured to enable subscribers to access database-driven, market-specific product information, and use that information, for example, to tailor displays on online food and beverage ordering/viewing systems. Further each participant can specify the terms/restrictions associated with their participation and the system can optimize viewing of food and beverage items, reservations, and deliveries and manage pricing and payment of any order accordingly.

20 Claims, 8 Drawing Sheets

Related U.S. Application Data continuation of application No. 14/628,115, filed on Feb. 20, 2015, now Pat. No. 9,384,505.

(60) Provisional application No. 62/118,358, filed on Feb. 19, 2015, provisional application No. 62/091,080, filed on Dec. 12, 2014.

(51) Int. Cl.
*G06Q 30/02* (2012.01)
*G06F 16/951* (2019.01)
*G06Q 20/10* (2012.01)

(52) U.S. Cl.
CPC ......... *G06Q 20/14* (2013.01); *G06Q 30/0282* (2013.01); *G06Q 30/0633* (2013.01); *G06Q 30/0641* (2013.01); *G06Q 30/0643* (2013.01)

(56) References Cited

U.S. PATENT DOCUMENTS

| | | |
|---|---|---|
| 9,384,505 B1 | 7/2016 | Cao |
| 10,497,040 B2 | 12/2019 | Cao |
| 2003/0061147 A1 | 3/2003 | Fluhr et al. |
| 2006/0218043 A1 | 9/2006 | Rosenzweig et al. |
| 2012/0036028 A1 | 2/2012 | Webb |
| 2012/0232917 A1 | 9/2012 | Al-Khudairy et al. |
| 2012/0278204 A1 | 11/2012 | Urano et al. |
| 2013/0238451 A1 | 9/2013 | Riscalla |
| 2013/0325641 A1 | 12/2013 | Brown et al. |
| 2013/0339163 A1 | 12/2013 | Dumontet et al. |
| 2014/0025524 A1 | 1/2014 | Sims et al. |
| 2016/0171584 A1 | 6/2016 | Cao |
| 2017/0061518 A1 | 3/2017 | Cao |

OTHER PUBLICATIONS

[No Author Listed], http://www.diningin.com, retrieved Aug. 13, 2015, 3 pages.

[No Author Listed], Find Dishes, "web.archive.org" capture of "www.foodspotting.com," available as of Dec. 2014, 3 pages.

[No Author Listed], TryCaviar.com Screen Capture from archive.org captured on Oct. 2014 and from Trycaviar.com downloaded Sep. 2015. 2 pages.

[No Author Listed], Diningin.com Screen Captures downloaded Sep. 2015. 2 pages.

[No Author Listed], Foodler.com Screen Captures downloaded Sep. 2015. 1 page.

SYSTEM AND METHOD FOR IMAGE BASED VIEWING AND ORDERING

RELATED APPLICATIONS

This application is a Continuation of U.S. application Ser. No. 15/200,158, filed Jul. 1, 2016, entitled "SYSTEM AND METHOD FOR IMAGE BASED VIEWING AND ORDERING", which is a Continuation of U.S. application Ser. No. 14/628,115, filed Feb. 20, 2015, entitled "SYSTEM AND METHOD FOR IMAGE BASED VIEWING AND ORDERING", which is a Non-Provisional of Provisional (35 USC 119(e)) of U.S. Application Ser. No. 62/118,358, filed Feb. 19, 2015, entitled "SYSTEM AND METHOD FOR OPTIMIZING MENU GENERATION AND DISPLAY and a Non-Provisional of Provisional (35 USC 119 (e)) of U.S. Application Ser. No. 62/091,080, filed Dec. 12, 2014, entitled "SYSTEM AND METHOD FOR IMAGE BASED VIEWING AND ORDERING". The entire contents of these applications are incorporated herein by reference in their entirety.

BACKGROUND

Various systems and options exist to facilitate ordering and delivery of food to consumers. The "take-out" market represents significant market share of food sales. However options are limited to conventional text or phone ordering systems (e.g., GRUBHUB) or other reservation styled systems (e.g., OPENTABLE).

SUMMARY

It is realized that improvements over conventional food service systems and methodologies are needed. In particular, it is appreciated that it would be beneficial to have a system that provides a complete electronic or online photo menu or directory of any food service provider (e.g., restaurants, take-out, dine-in, food cart, mobile food provider, niche markets, etc.), to deliver customers easy and comprehensive views of any food offering. These electronic or online photo menus should provide actual images of the food being offered (e.g., entrées, beverages, desserts, a-la-cart offerings, mobile food options, pre-packaged selections, custom offerings, on-demand offerings, etc.) or the location providing the food services. According to some embodiments, the images of the food items being offered are collected from a plurality of food service providers into image based menus.

According to some embodiments, the terms "image based menu" and "visual menu" are used in this application to connote the inclusion of an image of a food or beverage item (e.g., an entrée, an available beverage, a dessert, etc.) into a display of food or beverages that can be searched or viewed by a customer. In other embodiments, "image based menus" or "visual menus" include no text displays of images of the food or beverage, where the images are taken by a respective provider, and in yet others, "image based menus" or "visual menus" can also include images of the food or beverage taken by patrons of the provider. In further examples, individual images in no text displays can be linked to additional information including text information regarding, for example, allergen information, price, location, delivery options, etc.

According to further embodiments, the system can generate image based menus representative of the food offering being made available by a provider. In some embodiments, representative of the food offering is used to describe image based menus that include all offering, all currently available offerings, substantially all of the provider's offerings, and substantially all of the provider's currently available offerings. In yet other embodiments, representative of the food offerings can include any one of or more of: seventy percent or more of the provider's offerings, seventy five percent or more of the provider's offerings, eighty percent or more of the provider's offerings, eighty five percent or more of the provider's offerings, ninety percent or more of the provider's offerings, or ninety five percent or more of the provider's offerings.

According to some aspects, image based menus enable customers to view and/or search through dynamically generated food options and/or current or temporally limited displays of food options being provided. In essence, dynamically generated menus are created across any number of providers or locations and organized to provide a comprehensive and easily appreciated view of the multitudes of food options available. In further embodiments, the image based menus are arranged responsive to any input of a preference (e.g., a food or beverage style, food or beverage type, price, location, delivery option, delivery time, rating, connections to a provider, distance to a provider, etc.) by the customer, prompting the system to dynamically generate image based menus tailored to the customer.

Various aspects and embodiments relate to the realization that existent avenues for access to food and beverage choices are inadequate in communicating choices. Various embodiments implement methods and systems and associated hardware to provide users current or real time information in a form that presents currently available choices in an intelligible manner. Such hardware may include cameras, phones with such cameras and even light boxes to provide current or real time and updated pictorial representations of offerings. Those images will then be made available in a database with fully functional software to allow searches based upon individual choices whether it be, for example, meat or dairy, or more refined by dairy or gluten free and the like. Important in some examples, the image from one provider is available but also equivalent images from other competing locations to offer choices to the user based on the image of the food itself and any accompanying information including price, calorie count, and recommendations by professional or amateur users, etc. Unlike other offerings, the information is maintained to be current and preferably allow a user to order.

While images from amateur or other third party users may be available for comparison in some embodiments, the database provides consistency in its images to allow easy recognition and differentiation of such offering. Prior such databases provide only written description of each offering with perhaps a few relevant images which made searching and comparison difficult and frustrating at best. The fully functional and searchable database in the preferred embodiments herein allow determination of the most suitable offering quickly and with full knowledge of what will actually be provided and then delivered. While this database can be made available on any computer or hardware device, the database can be implemented on portable systems like a PDA, a mobile phone, a smart phone, or a tablet, etc. Such can be supplied within the provider location to allow users to determine what may be suitable for consumption for themselves, or even to allow ordering within the location as a take-out or eat-in situation. In some examples, it is expected that the computer or PDA will be used to order offerings to a place of work or an accommodation, preferably with suitably outfitted and screened delivery personnel.

Software within each such device can accommodate user interactions to score the offering once it arrives within the provider location or private place (e.g., delivery location) as well as to score the delivery service itself. In this manner there will be provided timely feedback (or even instant such feedback) to allow the provider to alter its offerings in current or real time (meaning instantly or within a few hours or even a few days) and to adjust the manner of delivery or the individuals involved therewith. For example, an offering that is well received can be promoted via the offering devices or via social media, and those less well received can be removed from the database completely or amended to accommodate user desires (perhaps providing more of the offering or reducing calorie count and the like). In some embodiments, commentary on any offering can be tracked by the system and communicated to the respective provider to adjust their offerings accordingly.

According to some embodiments, those delivery personnel who perform well can be provided more lucrative routes and offerings, while those who do not do well can be removed from the system. The scoring system can provide for multiple manners of feedback not only on the offering and the delivery but with specifics such as whether the offering provided was appropriately presented, appeared as the image portrayed, tasted appropriately, arrived in a timely fashion, used appropriate containers, and how it compared to similar offerings from other providers vis-à-vis price range. Such a scoring system may determine how, if and when offerings are presented to the user within the computer interface.

In further embodiments, delivery personnel can be judged and scored upon timeliness, appearance, cleanliness and other accommodating features. Since time for delivery is relevant to many users a provider will be similarly judged and scored by the delivery personnel to ensure that they provide sufficient time to actually finish the delivery. Such personnel may be privately hired by the provider or may be provided by a third party in association with this system.

According to at least some embodiments, the illustrative features above provide for the first time a system that truly accommodates the needs of busy users who desire relevant information in an accessible format such that each user can determine what is important for themselves and thereby select more rapidly and with more certainly of success in choice. Each provider can supply a parallel hard copy format of their offerings to show users in a more traditional manner what is available from or at that provider. A user will then be able to rapidly determine whether such provider is suitable for their needs and requirements by comparing such with the system on their computer, PDA or other device, or even with the provider's own device should it be set up for access to other providers. In this way each provider can coordinate offerings and make recommendations as needed for users with specific needs so that related providers can ensure higher overall user satisfaction and set a standard against which non users of such system cannot compare.

In yet other aspects, it is realized that image based menus and delivery options can occur within a specific provider's space. For example, a patron can enter the restaurant of their choice, review an image based menu online, and order food for delivery to a location in the provider's establishment (e.g., to a table or to a location at a bar).

Further aspects and embodiments are directed to image based viewing and/or ordering systems and methods. The image based viewing functionality organizes images of the food, beverage, appetizer, sides, etc., to be ordered by a customer into sorted images of food results, in essence a visual menu organizing images of the food or beverage to be ordered. In some examples, no text descriptions are provided for a customer to understand what is being offered through the image based displays. A customer may enter visual selections into the visual display (e.g., by clicking, touching, swiping, etc., an image of a food offering) and the selections are used to generate food or beverage selections or orders from any number of providers. According to some embodiments, a system for managing image based menus includes a suite of data management applications for providers (e.g., businesses in the restaurant or food and beverage industry). The providers can subscribe to the system in order to access the image based display, ordering, and reservation capabilities provided. In some embodiments, the suite of data management applications can be configured to enable subscribers to access database-driven, market-specific product information, and use that information to tailor displays on online food or beverage ordering/viewing systems.

Various embodiments provide a rich source for data and facilitate ordering, reservation, and delivery of food or beverage services, thereby increasing restaurant or vendor sales and generating valuable behavior information to aid in completing orders. Once a restaurant or vendor has subscribed to the system and input information on their offerings, users can review image based menus including the provider's food or beverage options. In some embodiments, the system manages ordering, payment, reservation, and optionally delivery to the user.

According to one aspect, a system for managing image based viewing of food or beverage items is provided. The system comprises at least one processor operatively connected to a memory, a menu engine, executed by at least one processor, configured to: search description characteristics associated with images of food or beverage items or respective providers from a plurality of providers to return results based on user input criteria, wherein the results are filtered images of the food or beverage items responsive to the user input criteria, a display engine, executed by the at least one processor, configured to display at least one user interface, and wherein the at least one user interface is configured to accept user selection of at least one of the images of the food or beverage items, and an image component configured to manage a plurality of images of the food or beverage items generated by respective ones of the plurality of providers.

According to one aspect, a system for managing image based ordering of food or beverage items is provided. The system comprises at least one processor operatively connected to a memory, a menu engine, executed by at least one processor, configured to search description characteristics associated with images of food or beverage items or respective providers from a plurality of providers to return results based on user input criteria, wherein the results are filtered images of the food or beverage items responsive to the user input criteria, a display engine, executed by the at least one processor, configured to display at least one user interface, and wherein the at least one user interface is configured to accept user selection of at least one of the images of the menu items; and a payment component configured to: manage payment verification associated with the user, mange payment distribution between at least one of: one or more providers and one or more delivery entities.

According to one aspect, a system for generating image based menus is provided. The system comprises at least one processor operatively connected to a memory, a menu engine, executed by at least one processor, configured to: search description characteristics associated with images of food or beverage items or respective providers from a plurality of providers to return results based on user input criteria, wherein the results are filtered images of the food or beverage items responsive to the user input criteria, and a display engine, executed by the at least one processor, configured to: display at least one user interface, wherein the at least one user interface is configured to accept user selection of at least one of the images of the menu items, and generate the image based menu dynamically responsive to available images of the food or beverage items meeting display criteria defined on the system or meeting display preferences associated with the user.

According to one aspect, a system for coordinating delivery of food or beverage items from a plurality of providers is provided. The system comprises at least one processor operatively connected to a memory, a display engine, executed by the at least one processor, configured to display at least one user interface, wherein the user interface is configured to accept user selection of a plurality of the images of food or beverage items associated with a plurality of providers, and an ordering engine, executed by the at least one processor, configured to: request the food or beverage items associated with the plurality of images from one or more respective providers associated with any selected image, and coordinate delivery of the food or beverage items from a plurality of providers and one or more delivery providers.

According to one aspect, a system for managing image based viewing or ordering is provided. The system comprises at least one processor operatively connected to a memory, a menu engine, executed by at least one processor of the at least one server, configured to: organize images of vendors or menu options from a plurality of providers, and search description characteristics associated with the images of the vendor or menu options from the plurality of providers to return results based on user input criteria, wherein the results are filtered images of the menu options generated responsive to the user input criteria, a display engine, executed by the at least one processor, configured to display at least one user interface, and which is configured to accept user selection of at least one of the images of the menu items, and an ordering engine, executed by the at least one processor, configured to request the at least one selected image of the vendor or menu item from one or more respective providers associated with the any selected image.

In various embodiments any one, two, three, four, or five of the preceding systems can include any combination selected from the following features (e.g., any one, two, three, four, five, six, seven, eight, nine, ten, eleven, twelve, thirteen, fourteen, fifteen, sixteen, seventeen, eighteen, nineteen, twenty, twenty one, twenty two, twenty three, twenty four, twenty five, or more features) wherein: the systems further comprise an image component configured to manage a plurality of images of the food or beverage items generated by respective ones of the plurality of providers; the systems further comprise a payment component configured to: manage payment verification associated with the user, mange payment distribution between at least one of: one or more providers and one or more delivery entities; the display engine, is further configured to generate an image based menu dynamically responsive to available images of the food or beverage items meeting display criteria defined on the system or meeting display preferences associated with the user; the systems further comprise an ordering engine, executed by the at least one processor, configured to: request the food or beverage items associated with the plurality of images from one or more respective providers associated with any selected image, and coordinate delivery of the food or beverage items from a plurality of providers and one or more delivery providers; the systems further comprise ordering engine, executed by the at least one processor, configured to request the at least one selected image of the vendor or menu item from one or more respective providers associated with the any selected image; the at least one user interface displays at least one option for receiving user input for vendor, food type, beverage type and the menu engine is further configured to return results based on a received vendor, food type, beverage type across a plurality of providers; the menu engine is further configured to organize the images of the vendor, or menu options based on a plurality of descriptive characteristics including any one or more of: vendor, food type, beverage type, name, related dish, provider location, delivery options, pick-up options, eat-in options, price, vegetarian, vegan, pescatarian, gluten free, lactose-free, nut free, ethnicity, kosher, gluten free, grain free, meat free, egg free, fish free, shellfish free, soybean free, rating, minimum requirement and provider; the menu engine is further configured to search and generate results responsive to user input of any of the plurality of the descriptive characteristics; the systems further comprise a rating engine, executed by the at least one processor, configured to accept user feedback associated with food or beverage items or the provider; the systems further comprise a network engine configured to generate an association between at least two users having in common one or more of the following: having selected same vendor or menu item, providing rating or feedback, connected socially on interface or through other social networking engines, having same user status, user providing feedback, etc; the systems further comprise a network engine, executed by the at least one processor, configured to generate a network of connected users responsive to analyzing user feedback provided to the system; the network engine is further configured to enable users to follow feedback submitted to the system based on a vendor, menu item or selected user; wherein the network engine is further configured to enable users to filter user feedback submitted to the system; the network engine is configured to generate the network responsive to a degree of separation of the user provided to the system; the systems further comprise a profile engine, executed by the at least one processor, configured to generate a user profile responsive to analyzing vendor, menu item or user feedback submitted to the system; the display engine is configured to display, for at least one menu option, an indication of a number of remaining items that can be ordered; the systems are implemented at least on a mobile device or a mobile application executing on a mobile device; a mobile device displays the at least one user interface and receives user input for the at least one of the images or user feedback; the ordering engine is further configured to manage a request for a plurality of items from a plurality of providers; each image of a food or beverage item is associated with a display period; the display engine is configured to limit display of any image of the food or beverage item not meeting an associated display period; at least some images of food or beverage items are associated with an availability status; the display engine is further configured to limit display of any image of the food or beverage item based on the availability status; at least one user is able to define food allergies as part of a user profile, and the display engine is further configured to eliminate any offering from the results returned to the user based on allergen information associated with a food or beverage item; the ordering engine is further configured to select one or more delivery service providers to dynamically generate a delivery route including pick-up of a plurality of food or beverage items at a plurality of providers; and the ordering engine is further configured to select a plurality of delivery service providers to dynamically generate a delivery route for the respective providers including pick-up of a plurality of food or beverage items at a plurality of providers, wherein the respective delivery routes synchronize a delivery time at a delivery location.

According to another aspect, a computer implemented method for managing image based viewing of food or beverage items is provided. The method comprises searching, by a computer system, description characteristics associated with images of food or beverage items or respective providers from a plurality of providers to return results based on user input criteria, wherein the act of searching includes filtering the images of the food or beverage items responsive to the user input criteria, displaying, by the computer system, at least one user interface, and wherein the at least one user interface is configured to accept user selection of at least one of the images of the food or beverage items, and managing, by the computer system, a plurality of images of the food or beverage items generated by respective ones of the plurality of providers.

According to another aspect, a computer implemented method for managing image based ordering of food or beverage items is provided. The method comprises searching, by a computer system, description characteristics associated with images of food or beverage items or respective providers from a plurality of providers to return results based on user input criteria, wherein the act of searching includes filtering the images of the food or beverage items responsive to the user input criteria, displaying, by the computer system, at least one user interface, and wherein the at least one user interface is configured to accept user selection of at least one of the images of the food or beverage items, and managing, by the computer system, payment verification associated with the user, wherein managing payment verification includes managing payment distribution between at least one of: one or more providers and one or more delivery entities.

According to another aspect, a computer implemented system for generating image based menus is provided. The method comprises searching, by a computer system, description characteristics associated with images of food or beverage items or respective providers from a plurality of providers to return results based on user input criteria, wherein the act of searching includes filtering the images of the food or beverage items responsive to the user input criteria, displaying, by the computer system, at least one user interface, and wherein the at least one user interface is configured to accept user selection of at least one of the images of the food or beverage items, and generating, by the computer system, the image based menu dynamically responsive to available images of the food or beverage items meeting display criteria defined on the system or meeting display preferences associated with the user.

According to another aspect, a computer implemented method for coordinating delivery of food or beverage items from a plurality of providers is provided. The method comprises displaying, by the computer system, at least one user interface, and wherein the user interface is configured to accept user selection of a plurality of the images of food or beverage items associated with a plurality of providers, requesting, by the computer system, the food or beverage items associated with the plurality of images from one or more respective providers associated with any selected image, and automatically coordinating, by the computer system, delivery of the food or beverage items from a plurality of providers and one or more delivery providers.

According to another aspect, a computer implemented method for managing image based viewing or ordering is provided. The method comprises organizing, by a computer system, images of vendors or menu options from a plurality of providers, searching, by the computer system, description characteristics associated with the images of the vendor or menu options from the plurality of providers to return results based on user input criteria, wherein the act of searching includes filtering results of the images of the menu options responsive to the user input criteria, displaying, by the computer system, at least one user interface configured to accept user selection of at least one of the images of the vendors or menu items, and requesting, by the computer system, the at least one selected image of the vendor or menu items from one or more respective providers associated with the any selected image.

In various embodiments any one, two, three, four, or five of the preceding methods can include any combination selected from the following features (e.g., any one, two, three, four, five, six, seven, eight, nine, ten, eleven, twelve, thirteen, fourteen, fifteen, sixteen, seventeen, eighteen, nineteen, twenty, twenty one, twenty two, twenty three, twenty four, twenty five, or more features) wherein: the methods further comprise an act of managing, by the computer system, a plurality of images of the food or beverage items generated by respective ones of the plurality of providers; the methods further comprise acts of: managing, by the computer system, payment verification associated with the user, managing, by the computer system, payment distribution between at least one of: one or more providers and one or more delivery entities; the methods further comprise an act of generating, by the computer system, an image based menu dynamically responsive to available images of the food or beverage items meeting display criteria defined on the system or meeting display preferences associated with the user; the methods further comprise acts of: requesting, by the computer system, the food or beverage items associated with the plurality of images from one or more respective providers associated with any selected image, and coordinating, by the computer system, delivery of the food or beverage items from a plurality of providers and one or more delivery providers; the methods further comprise an act of requesting, by the computer system, the at least one selected image of the vendor or menu item from one or more respective providers associated with the any selected image; the methods further comprise displaying, by the at least one user interface at least one option for receiving user input for vendor, food type, beverage type and the menu engine is further configured to return results based on a received vendor, food type, beverage type, review or rating type, availability type, price, minimum order, etc. across a plurality of providers; the methods further comprise an act of receiving feedback associated with any one or more of: a food or beverage item, a provider, a delivery provider by any respective participant in the delivery; the methods further comprise an act of generating an association between at least two users having in common one or more of the following: having selected same vendor or menu item, providing rating or feedback, connected socially on interface or through other social networking engines, having same user status, user providing feedback, user having same proximity, user having selected same price range, etc.; the act of generating the association includes generating a network of connected users responsive to analyzing user feedback provided to the system; the methods further comprise an act of communicating feedback submitted to the system to another user, based on a vendor, menu item or selected user, identified by the another user; generating the network is executed by the computer system responsive to determining a degree of separation of the user provided to the system; the methods further comprise an act of generating a user profile responsive to viewing, ordering, analyzing vendor, menu item, or user rating or feedback, or historic interactions; the methods further comprise an act of managing a request for a plurality of items from a plurality of providers; the methods further comprise an act of generating, by the computer system, a reservation at a least one provider location responsive to user selections; the methods further comprise an act of displaying, by the computer system, any allergen information associated with an order; the methods further comprise an act of determining matches between allergies defined in a user profile and allergen information for at least one food or beverage item; each image of a food or beverage item is associated with a display period; the methods further comprise an act of limiting, by the computer system, display of any image of the food or beverage item not meeting an associated display period; at least some images of food or beverage items are associated with an availability status; the methods further comprise an act of limiting, by the computer system, display of any image of the food or beverage item based on the availability status; the methods further comprise acts of: accessing information on food allergies as part of a user profile, and eliminating any offering from the results returned to the user based on allergen information associated with a food or beverage item; the methods further comprise an act of selecting one or more delivery service providers to dynamically generate a delivery route including pick-up of a plurality of food or beverage items at a plurality of providers; the methods further comprise an act of selecting a plurality of delivery service providers to dynamically generate a delivery route for the respective providers including pick-up of a plurality of food or beverage items at a plurality of providers, wherein the respective delivery routes synchronize a delivery time at a delivery location.

According to one aspect, a system comprises at least one processor operatively connected to a memory, a menu engine, executed by at least one processor, configured to: search description characteristics associated with images of food items or respective providers from a plurality of providers to return results based on user input criteria, wherein the results are filtered images of the food items responsive to the user input criteria, a display engine, executed by the at least one processor, configured to display at least one user interface, and wherein the at least one user interface is configured to accept user selection of at least one of the images of the food items, and an image component configured to manage a plurality of images of the food items generated by respective ones of the plurality of providers.

According to one aspect, a system comprises at least one processor operatively connected to a memory, a menu engine, executed by at least one processor, configured to search description characteristics associated with images of food items or respective providers from a plurality of providers to return results based on user input criteria, wherein the results are filtered images of the food items responsive to the user input criteria, a display engine, executed by the at least one processor, configured to display at least one user interface, and wherein the at least one user interface is configured to accept user selection of at least one of the images of the menu items; and a payment component configured to: manage payment verification associated with the user, mange payment distribution between at least one of: one or more providers and one or more delivery entities.

According to one aspect, a system comprises at least one processor operatively connected to a memory, a menu engine, executed by at least one processor, configured to: search description characteristics associated with images of food items or respective providers from a plurality of providers to return results based on user input criteria, wherein the results are filtered images of the food items responsive to the user input criteria, and a display engine, executed by the at least one processor, configured to: display at least one user interface, wherein the at least one user interface is configured to accept user selection of at least one of the images of the menu items, and generate the image based menu dynamically responsive to available images of the food items meeting display criteria defined on the system or meeting display preferences associated with the user.

According to one aspect, a system comprises at least one processor operatively connected to a memory, a display engine, executed by the at least one processor, configured to display at least one user interface, wherein the user interface is configured to accept user selection of a plurality of the images of food items associated with a plurality of providers, and an ordering engine, executed by the at least one processor, configured to: request the food items associated with the plurality of images from one or more respective providers associated with any selected image, and coordinate delivery of the food items from a plurality of providers and one or more delivery providers.

According to one aspect, a system comprises at least one processor operatively connected to a memory, a menu engine, executed by at least one processor of the at least one server, configured to: organize images of vendors or menu options from a plurality of providers, and search description characteristics associated with the images of the vendor or menu options from the plurality of providers to return results based on user input criteria, wherein the results are filtered images of the menu options generated responsive to the user input criteria, a display engine, executed by the at least one processor, configured to display at least one user interface, and which is configured to accept user selection of at least one of the images of the menu items, and an ordering engine, executed by the at least one processor, configured to request the at least one selected image of the vendor or menu item from one or more respective providers associated with the any selected image.

In various embodiments any one, two, three, four, or five of the preceding systems can include any combination selected from the following features (e.g., any one, two, three, four, five, six, seven, eight, nine, ten, eleven, twelve, thirteen, fourteen, fifteen, sixteen, seventeen, eighteen, nineteen, twenty, twenty one, twenty two, twenty three, twenty four, twenty five, or more features) wherein: the systems further comprise an image component configured to manage a plurality of images of the food items generated by respective ones of the plurality of providers; the systems further comprise a payment component configured to: manage payment verification associated with the user, mange payment distribution between at least one of: one or more providers and one or more delivery entities; the display engine, is further configured to generate an image based menu dynamically responsive to available images of the food items meeting display criteria defined on the system or meeting display preferences associated with the user; the systems further comprise an ordering engine, executed by the at least one processor, configured to: request the food items associated with the plurality of images from one or more respective providers associated with any selected image, and coordinate delivery of the food items from a plurality of providers and one or more delivery providers; the systems further comprise ordering engine, executed by the at least one processor, configured to request the at least one selected image of the vendor or menu item from one or more respective providers associated with the any selected image; the at least one user interface displays at least one option for receiving user input for vendor, food type, beverage type and the menu engine is further configured to return results based on a received vendor, food type, beverage type across a plurality of providers; the menu engine is further configured to organize the images of the vendor, or menu options based on a plurality of descriptive characteristics including any one or more of: vendor, food type, beverage type, name, related dish, provider location, delivery options, pick-up options, eat-in options, price, vegetarian, vegan, pescatarian, gluten free, lactose-free, nut free, ethnicity, kosher, gluten free, grain free, meat free, egg free, fish free, shellfish free, soybean free, rating, minimum requirement and provider; the menu engine is further configured to search and generate results responsive to user input of any of the plurality of the descriptive characteristics; the systems further comprise a rating engine, executed by the at least one processor, configured to accept user feedback associated with food items or the provider; the systems further comprise a network engine configured to generate an association between at least two users having in common one or more of the following: having selected same vendor or menu item, providing rating or feedback, connected socially on interface or through other social networking engines, having same user status, user providing feedback, etc; the systems further comprise a network engine, executed by the at least one processor, configured to generate a network of connected users responsive to analyzing user feedback provided to the system; the network engine is further configured to enable users to follow feedback submitted to the system based on a vendor, menu item or selected user; wherein the network engine is further configured to enable users to filter user feedback submitted to the system; the network engine is configured to generate the network responsive to a degree of separation of the user provided to the system; the systems further comprise a profile engine, executed by the at least one processor, configured to generate a user profile responsive to analyzing vendor, menu item or user feedback submitted to the system; the display engine is configured to display, for at least one menu option, an indication of a number of remaining items that can be ordered; the systems are implemented at least on a mobile device or a mobile application executing on a mobile device; a mobile device displays the at least one user interface and receives user input for the at least one of the images or user feedback; the ordering engine is further configured to manage a request for a plurality of items from a plurality of providers; each image of a food item is associated with a display period; the display engine is configured to limit display of any image of the food item not meeting an associated display period; at least some images of food items are associated with an availability status; the display engine is further configured to limit display of any image of the food item based on the availability status; at least one user is able to define food allergies as part of a user profile, and the display engine is further configured to eliminate any offering from the results returned to the user based on allergen information associated with a food item; the ordering engine is further configured to select one or more delivery service providers to dynamically generate a delivery route including pick-up of a plurality of food items at a plurality of providers; and the ordering engine is further configured to select a plurality of delivery service providers to dynamically generate a delivery route for the respective providers including pick-up of a plurality of food items at a plurality of providers, wherein the respective delivery routes synchronize a delivery time at a delivery location.

According to another aspect, a computer implemented comprises searching, by a computer system, description characteristics associated with images of food items or respective providers from a plurality of providers to return results based on user input criteria, wherein the act of searching includes filtering the images of the food items responsive to the user input criteria, displaying, by the computer system, at least one user interface, and wherein the at least one user interface is configured to accept user selection of at least one of the images of the food items, and managing, by the computer system, a plurality of images of the food items generated by respective ones of the plurality of providers.

According to another aspect, a computer implemented comprises searching, by a computer system, description characteristics associated with images of food items or respective providers from a plurality of providers to return results based on user input criteria, wherein the act of searching includes filtering the images of the food items responsive to the user input criteria, displaying, by the computer system, at least one user interface, and wherein the at least one user interface is configured to accept user selection of at least one of the images of the food items, and managing, by the computer system, payment verification associated with the user, wherein managing payment verification includes managing payment distribution between at least one of: one or more providers and one or more delivery entities.

According to another aspect, a computer implemented method comprises searching, by a computer system, description characteristics associated with images of food items or respective providers from a plurality of providers to return results based on user input criteria, wherein the act of searching includes filtering the images of the food items responsive to the user input criteria, displaying, by the computer system, at least one user interface, and wherein the at least one user interface is configured to accept user selection of at least one of the images of the food items, and generating, by the computer system, the image based menu dynamically responsive to available images of the food items meeting display criteria defined on the system or meeting display preferences associated with the user.

According to another aspect, a computer implemented method comprises displaying, by the computer system, at least one user interface, and wherein the user interface is configured to accept user selection of a plurality of the images of food items associated with a plurality of providers, requesting, by the computer system, the food items associated with the plurality of images from one or more respective providers associated with any selected image, and automatically coordinating, by the computer system, delivery of the food items from a plurality of providers and one or more delivery providers.

According to another aspect, a computer implemented method comprises organizing, by a computer system, images of vendors or menu options from a plurality of providers, searching, by the computer system, description characteristics associated with the images of the vendor or menu options from the plurality of providers to return results based on user input criteria, wherein the act of searching includes filtering results of the images of the menu options responsive to the user input criteria, displaying, by the computer system, at least one user interface configured to accept user selection of at least one of the images of the vendors or menu items, and requesting, by the computer system, the at least one selected image of the vendor or menu items from one or more respective providers associated with the any selected image.

In various embodiments any one, two, three, four, or five of the preceding methods can include any combination selected from the following features (e.g., any one, two, three, four, five, six, seven, eight, nine, ten, eleven, twelve, thirteen, fourteen, fifteen, sixteen, seventeen, eighteen, nineteen, twenty, twenty one, twenty two, twenty three, twenty four, twenty five, or more features) wherein: the methods further comprise an act of managing, by the computer system, a plurality of images of the food items generated by respective ones of the plurality of providers; the methods further comprise acts of: managing, by the computer system, payment verification associated with the user, managing, by the computer system, payment distribution between at least one of: one or more providers and one or more delivery entities; the methods further comprise an act of generating, by the computer system, an image based menu dynamically responsive to available images of the food items meeting display criteria defined on the system or meeting display preferences associated with the user; the methods further comprise acts of: requesting, by the computer system, the food items associated with the plurality of images from one or more respective providers associated with any selected image, and coordinating, by the computer system, delivery of the food items from a plurality of providers and one or more delivery providers; the methods further comprise an act of requesting, by the computer system, the at least one selected image of the vendor or menu item from one or more respective providers associated with the any selected image; the methods further comprise displaying, by the at least one user interface at least one option for receiving user input for vendor, food type, beverage type and the menu engine is further configured to return results based on a received vendor, food type, beverage type, review or rating type, availability type, price, minimum order, etc. across a plurality of providers; the methods further comprise an act of receiving feedback associated with any one or more of: a food item, a provider, a delivery provider by any respective participant in the delivery; the methods further comprise an act of generating an association between at least two users having in common one or more of the following: having selected same vendor or menu item, providing rating or feedback, connected socially on interface or through other social networking engines, having same user status, user providing feedback, user having same proximity, user having selected same price range, etc.; the act of generating the association includes generating a network of connected users responsive to analyzing user feedback provided to the system; the methods further comprise an act of communicating feedback submitted to the system to another user, based on a vendor, menu item or selected user, identified by the another user; generating the network is executed by the computer system responsive to determining a degree of separation of the user provided to the system; the methods further comprise an act of generating a user profile responsive to viewing, ordering, analyzing vendor, menu item, or user rating or feedback, or historic interactions; the methods further comprise an act of managing a request for a plurality of items from a plurality of providers; the methods further comprise an act of generating, by the computer system, a reservation at a least one provider location responsive to user selections; the methods further comprise an act of displaying, by the computer system, any allergen information associated with an order; the methods further comprise an act of determining matches between allergies defined in a user profile and allergen information for at least one food item; each image of a food item is associated with a display period; the methods further comprise an act of limiting, by the computer system, display of any image of the food item not meeting an associated display period; at least some images of food items are associated with an availability status; the methods further comprise an act of limiting, by the computer system, display of any image of the food item based on the availability status; the methods further comprise acts of: accessing information on food allergies as part of a user profile, and eliminating any offering from the results returned to the user based on allergen information associated with a food item; the methods further comprise an act of selecting one or more delivery service providers to dynamically generate a delivery route including pick-up of a plurality of food items at a plurality of providers; the methods further comprise an act of selecting a plurality of delivery service providers to dynamically generate a delivery route for the respective providers including pick-up of a plurality of food items at a plurality of providers, wherein the respective delivery routes synchronize a delivery time at a delivery location.

According to one aspect, a graphical user interface is provided comprising a search tool display configured to receive user input of search criteria elements, a first display of images of including images of one or more food items made available by a plurality of food providers generated by filtering images of food items available in a database responsive to the user input search criteria, wherein each one of the images of one or more food items in the first display is responsive to user selection, and in response to selection is configured to add a food item associated with the images one or more food items to an order, an order display including information on the food item ordered and information on options for delivery or generating a reservation.

According to one aspect, a graphical user interface is provided comprising a search tool display configured to receive user input of search criteria elements, a first display of images of including images of a plurality of food items made available by a plurality of food providers generated by filtering images of food items available in a database responsive to the user input search criteria, wherein each one of the images of one or more food items in the first display is responsive to user selection, and in response to selection is configured to add a food item associated with the images one or more food items to an order, and an input tool displayed in the user interface for accepting images of food items from the plurality of providers.

In various embodiments any one or two or more of the preceding graphical user interfaces can include any combination selected from the following features (e.g., any one, two, three, four, five, six, seven, eight, nine, ten, eleven, twelve, thirteen, fourteen, fifteen, sixteen, seventeen, eighteen, nineteen, twenty, twenty one, or more features) wherein: the input tool is configured to communicate with imaging hardware at the plurality of provider locations to receive captures images of the food items by respective ones of the plurality of providers; the graphical user interface is further configured to generate an image based menu dynamically responsive to available images of the food items meeting display criteria defined on the system or meeting display preferences associated with the user; the graphical user interface is further configured to display at least one option for receiving user input for vendor, food type, and display results based on a received vendor or food type across a plurality of providers; the graphical user interface is further configured to organize the images of the vendor, or menu options based on a plurality of descriptive characteristics including any one or more of: vendor, food type, name, related dish, provider location, delivery options, pick-up options, eat-in options, price, organic, local, vegetarian, vegan, pescatarian, gluten free, lactose-free, nut free, ethnicity, kosher, gluten free, grain free, meat free, egg free, fish free, shellfish free, soybean free, rating, minimum requirement and provider; the graphical user interface is further configured to display, for at least one menu option, an indication of a number of remaining items that can be ordered; further comprises a completed order tool configured to transition the graphical user interface to the order display responsive to selection of the complete order tool; wherein user selection includes clicking with a visual pointer or touching in a touch sensitive display to select the food item; further comprises a welcome display of images of including one or more food items or one or more food providers generated at least in part based on a viewing history of a user; further comprises a welcome display of images of including one or more food items or one or more food providers generated at least in part based on location information determined for a user; the order display includes: a first provider display associated with a first provider and at least a first food item, a second provider display associated with a second provider and at least a second food item, and a delivery provider display for displaying candidate delivery providers, based on a delivery schedule created by an ordering engine based on the first and second provider locations and a delivery location; further comprises an accept order display tool configured to trigger requests to the first provider and the second provider for the food items, trigger one or more requests to one or more candidate delivery providers to pick up the food items from the first and second providers and deliver the food items to the delivery location; further comprises an accept order display tool configured to: trigger requests to the first provider and the second provider for the food items, trigger requests to a first candidate delivery provider and a second candidate delivery provider to pick up respective food items from the first and second providers and deliver the food items to the delivery location according to a synchronized delivery schedule; further comprises a select delivery options display tool configured to transition the graphical user interface to a delivery display; further comprises a delivery display configured to display a plurality of candidate delivery providers generated by an ordering engine based on an earliest possible delivery time; the ordering engine determines an earliest delivery time responsive to a preparation time associated with each food item in the order, candidate delivery providers proximate to the first and second provider, and delivery times associated with the candidate providers; each display of a candidate delivery provider is responsive to user selection, whereby a candidate delivery provider can be selected or excluded responsive to selection by the user; the ordering engine receives information on user selections in the graphical user interface; the delivery display is configured to dynamically update candidate delivery providers responsive to user selection and/or re-calculation of a delivery schedule by the ordering engine; further comprises a time input display configured to accept a user input delivery time; the delivery display is further configured to dynamically update the display of candidate delivery providers responsive to the input delivery time; the dynamic updating of the display is responsive to recalculation of candidate delivery providers by the ordering engine based on the input delivery time; and wherein the graphical user interface is implemented by any preceding system embodiment.

According to one aspect, system is provided. The system comprising at least one processor operatively connected to a memory; a menu engine, executed by at least one processor, configured to: search descriptive characteristics associated with food items or respective providers from a plurality of food providers to return results based on user input criteria, wherein the results are filtered images of the food items or respective food providers responsive to the user input criteria; a display engine, executed by the at least one processor, configured to: display at least one user interface, wherein the at least one user interface is configured to accept user selection of at least one of the images of the food items or the respective provider from the plurality of food providers; and display a respective image based menu representative of food offerings available at the respective provider, wherein the image based menu includes images of the food items representative of the food offerings made available by the respective provider.

In one embodiment, the display engine is further configured to generate a respective image based menu dynamically responsive to available images of the food items meeting display criteria defined on the system. In one embodiment, the display engine is further configured to analyze available food items and available providers to identify options meeting the display criteria based on display preferences associated with the user. In one embodiment, the display preferences include, for example, any one or more of maximum delivery distance, maximum delivery time, minimum rating, maximum price, minimum feedback, previous selection of a provider by other users, previous selection of a provider by other specified users.

In one embodiment, the system further comprises an ordering engine, executed by the at least one processor, configured to request the food items associated with the plurality of images from one or more respective providers associated with any selected image. In one embodiment, the ordering engine is further configured to coordinate delivery of the food items from a plurality of food providers and one or more delivery providers. In one embodiment, the ordering engine is further configured to: select candidate delivery providers for a group of potential delivery providers responsive to analyzing customer specified delivery preferences; and generate potential delivery routes for a plurality of candidate delivery providers based on determining a soonest coordinated delivery time for the candidate delivery providers at a delivery location.

In one embodiment, the ordering engine is further configured to analyze preparation time and schedule delivery pick up by the one or more delivery providers at respective locations of the plurality of food providers, and communicate an expected delivery time. In one embodiment, the ordering engine is further configured to: generate a plurality of respective delivery routes for a plurality of delivery providers and a plurality of provider locations; and coordinate arrival time of the plurality of delivery providers, based, at least in part, preparation time, expected travel time, and a coordinated delivery for each of the delivery providers at a delivery location.

In one embodiment, the system further comprises a payment component configured to: manage payment verification associated with the user; manage payment distribution between at least one of: one or more providers and one or more delivery entities. In one embodiment, the payment component is further configured to generate payment information responsive to scheduling a plurality of delivery providers and a plurality of food providers, wherein the payment information is determined to include gratuity, service fees, and any other charges in advanced of booking a food order. In one embodiment, the payment component is further configured to capture payment in advance of committing a delivery order.

According to one aspect a system is provided. The system comprises at least one processor operatively connected to a memory; a menu engine, executed by at least one processor, configured to: search descriptive characteristics associated with food items or respective providers from a plurality of food providers to return results based on user input criteria, wherein the results are filtered images of the food items or respective food providers responsive to the user input criteria; a display engine, executed by the at least one processor, configured to: display at least one user interface, wherein the at least one user interface is configured to accept user selection of at least one of the images of the food items; and generate an image based menu dynamically responsive to available images of the food items or the food providers meeting display criteria defined on the system.

In one embodiment, the system further comprises an image component configured to manage a plurality of images of the food items generated by respective ones of the plurality of food providers. In one embodiment, the image component is further configured to communicate with respective image capture devices at respective food provider locations to obtain images generated by the respective providers of prepared food items available for ordering. In one embodiment, the display engine is further configured to limit display of any image of the food item not meeting an associated display period starting with an image capture time. In one embodiment, the menu engine is further configured maintain availability status information on respective food items and limit display responsive to analyzing availability status.

In one embodiment, the system further comprises at least one user interface configured to display at least one option for receiving user input for vendor, food type, and wherein the menu engine is further configured to return results based on a received vendor, food type, across a plurality of providers. In one embodiment, the menu engine is further configured to organize the images of the vendor, or menu options based on a plurality of descriptive characteristics including any one or more of: vendor, food type, name, related dish, provider location, delivery options, pick-up options, eat-in options, price, organic, local, vegetarian, vegan, pescatarian, gluten free, lactose-free, nut free, ethnicity, kosher, gluten free, grain free, meat free, egg free, fish free, shellfish free, soybean free, rating, minimum requirement and provider.

In one embodiment, the system further comprises a rating engine, executed by the at least one processor, configured to accept user feedback associated with food items or the provider. In one embodiment, the system further comprises a network engine configured to generate an association between at least two users having in common one or more of the following: having selected same vendor or menu item, providing rating or feedback, connected socially on interface or through other social networking engines, having same user status, and user providing feedback. In one embodiment, the network engine is configured to generate the network responsive to a degree of separation of the user provided to the system.

In one embodiment, the system further comprises a profile engine, executed by the at least one processor, configured to generate a user profile responsive to analyzing vendor, menu item or user feedback submitted to the system. In one embodiment, the system includes at least a mobile device or a mobile application executing on a mobile device to interface with the menu engine, ordering engine, and display engine. In one embodiment, the system further comprises an ordering engine, executed by the at least one processor, configured to request the food items associated with the plurality of images from one or more respective providers associated with any selected image. In one embodiment, the ordering engine is further configured to coordinate delivery of the food items from a plurality of food providers and one or more delivery providers.

In one embodiment, the ordering engine is further configured to: select candidate delivery providers for a group of potential delivery providers responsive to analyzing customer specified delivery preferences; and generate potential delivery routes for a plurality of candidate delivery providers based on determining a soonest coordinated delivery time for the candidate delivery providers at a delivery location. In one embodiment, the ordering engine is further configured to analyze preparation time and schedule delivery pick up by the one or more delivery providers at respective locations of the plurality of food providers, and communicate an expected delivery time. In one embodiment, the ordering engine is further configured to: generate a plurality of respective delivery routes for a plurality of delivery providers and a plurality of provider locations; and coordinate arrival time of the plurality of delivery providers, based, at least in part, preparation time, expected travel time, and a coordinated delivery for each of the delivery providers at a delivery location.

In one embodiment, the system further comprises a payment component configured to: manage payment verification associated with the user; manage payment distribution between at least one of: one or more providers and one or more delivery entities. In one embodiment, the payment component is further configured to generate payment information responsive to scheduling a plurality of delivery providers and a plurality of food providers, wherein the payment information is determined to include gratuity, service fees, and any other charges in advanced of booking a food order. In one embodiment, the payment component is further configured to capture payment in advance of committing a delivery order.

Other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment or example.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
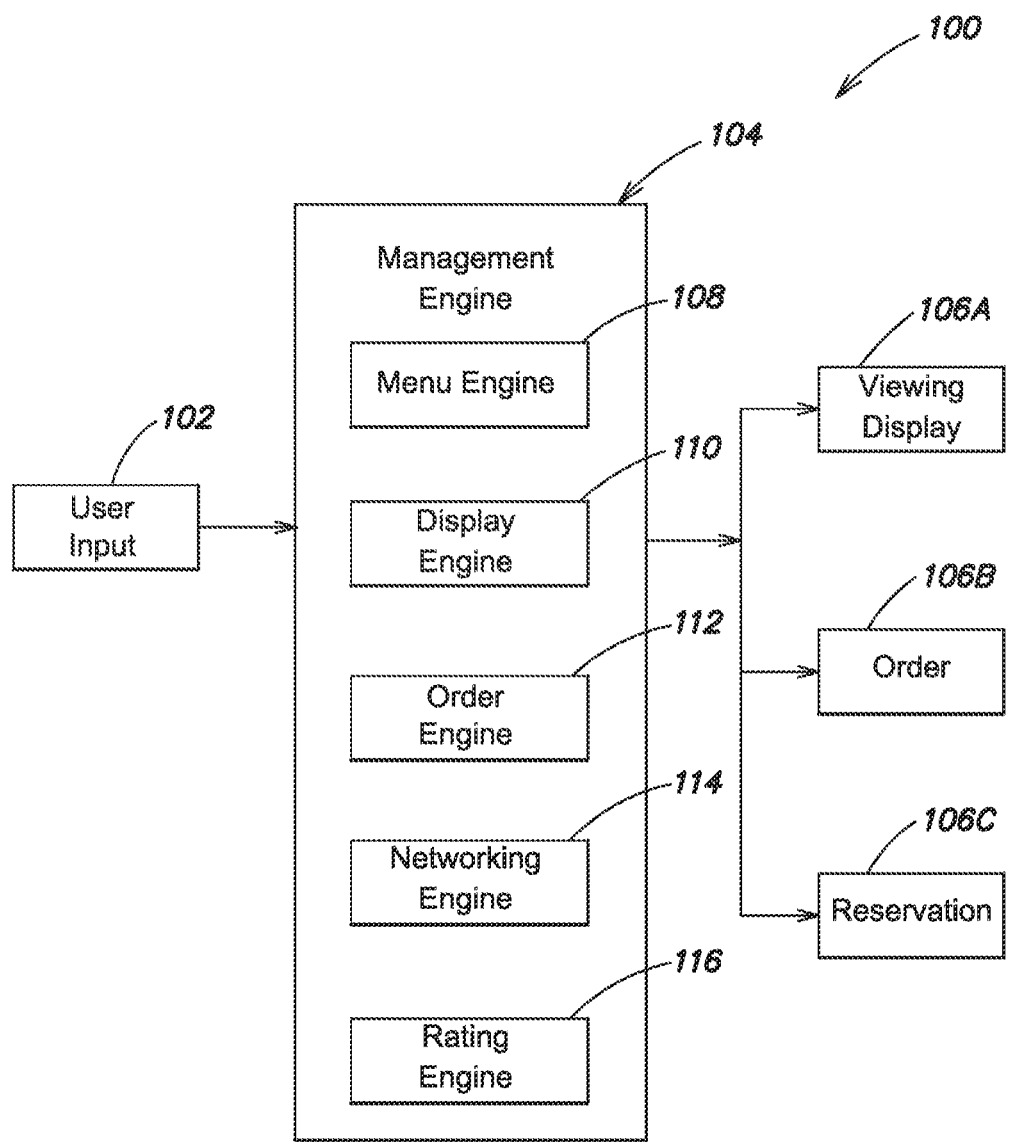
FIG. 1 is a block diagram of an example viewing and/or ordering system.

At least some embodiments disclosed herein include apparatus and processes for managing image based viewing and/or ordering of food, beverage, or any other food offering. According to some embodiments, provided is a system for accessing image based menus which can be organized and displayed based on food or beverage type across a number of providers (e.g., restaurants, fast-food locations, niche markets, etc.). For example, users can access a viewing or ordering system to search on any desired food or beverage type, or other food or beverage characteristic, and view image based results of options matching the food or beverage type or characteristics regardless of an associated provider and/or provider location. In some examples, the system provides access to high quality images taken of the prepared foods. In further examples, the system can provide access to images of prepared foods as soon as the food is prepared. The users are given the opportunity of seeing on-line what they are going to order. In some examples, the images can be captured and processed by the system and provided to the user in current or real time. According to one aspect, high end restaurants and specialty chefs may prepare limited number of specialty dishes. The system can be configured to track such scarce options, and provide tools for ordering and delivery, or for reserving one or more of the limited supply specialty dishes along with a reservation for a table.

In other embodiments, the system provides access to variety of food or beverage options that would conventionally be limited to a single provider. In further embodiments, the system can be configured to aggregate orders across multiple providers enabling customization of an order that includes any number of restaurants/providers. According to some implementations, the system can be accessed using a computer or mobile device executing an installed application. The application and/or system can be configured to generate and display user interfaces for enabling the user to enter selection of any image and request that the imaged food item be delivered to a user specified location.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Example Ordering System

Some embodiments implement an ordering system that manages storage, organization, and display of image based menus. The system can generate visual displays or a visual menu tailored to the user's preferences as well as the user specifies it. For example, the system searches and returns images of actual food or beverage items based on user entered search terms specifying one or more food or beverage characteristics (e.g., restaurant, food or beverage type, dietary restrictions, availability, rating, price, minimum requirements, allergen information, etc.). The system is configured to generate a visual display tailored to the returned results and/or the user. In some embodiments, users can select any number of items from the displayed images. The images may be real time captures of a prepared dish, beverage, appetizer, etc., allowing the user to view a fully prepared option of the food being selected based on images that are only hours or even minutes old. In further examples, specialty dishes are prepared as limited number orders. The images of these specialty dishes provide the expectation of receiving what is imaged. In yet other examples, the image may be the dish or food item that is being purchased for delivery, dining in or take-out. As used herein a food item includes solid foods, desserts, and any other human consumable solid for calorie and/or nutrition. Beverage item includes any liquid food and/or beverages, for example, served at a provider.

According to another embodiment, the ordering system includes ordering functionality to facilitate take-out, delivery and/or a reservation with an associated order. In some implementations, the system can manage order aggregation across a plurality of providers, manage the order and delivery of the food, beverage, etc., to the requesting user, and manage distribution of payment to the respective providers. Typically, the user receives an order confirmation specifying a delivery time and any additional instructions, if any.

FIG. 1 illustrates one embodiment of an ordering system 100. The ordering system 100 can be configured to manage searching, display, and ordering of any food or beverage item (e.g., entrée, beverage, dessert, etc.). The system can be configured to integrate with mobile devices and/or mobile applications executing on the mobile devices to provide access to search tools, display menus, and/or order or reservation functionality. In one example, the system 100 can include a management engine 104 configured to execute the search, display, and/or ordering or reservations functions. In some embodiments, various elements of the system 100 can be implemented by specially configuring a computing system such as the computer system 600 and/or 602 described with reference to FIG. 6. For example, the management engine 104 can be executed on the computer system 600 and/or 602 specially configured to provide the functions and operations discussed herein. In other embodiments, the management engine 104 can include additional components executed on the computer system to perform specific operations. In some implementations, the system 100 and/or management engine 104 can be configured to communicate with mobile applications and/or mobile devices to accept user input 102 and provide management of viewing (e.g., viewing display 106A), selection, ordering (e.g., order display 106B), reservation (e.g. reservation display 106C) and delivery of any food or beverage made available through subscribing providers (e.g., delivery 106D).

As shown in FIG. 1, the management engine 104 receives input 102 from users regarding food or beverage characteristics they wish to see. The food or beverage characteristics can include any description information regarding a food or beverage item (e.g., food type, vendor, beverage type, name, related dish, provider location, delivery options, pick-up options, eat-in options, price, organic, local, vegetarian, vegan, pescatarian, gluten free, lactose-free, nut free, ethnicity, kosher, gluten free, grain free, shellfish free, rating, minimum requirement, availability, and provider, among other options). Responsive to the user input 102 of food or beverage characteristics, the management engine 104 is configured to search a food database of images and associated information (e.g., associated food or beverage characteristics) to generate a viewing display 106A for the user. The user can select any displayed image of a food or beverage item via user input 102, for example, received by the management engine 104 and generate an order 106B based on one or more user selections. In further embodiments, the user can select an image of a food or beverage item or an image of a food provider to book reservations (e.g., 106C) with the provider. In some examples, the user can select the food they wish to order, schedule a reservation and/or time that the food will be ready for the user at a table at the provider location. The user may preselect any food or beverage item (e.g., entrée, side, beverage, dessert, etc.), and set a schedule for their meal through the reservation functionality.

According to some embodiments, the system 100 and/or engine 104 can include additional components configured to perform various functions on the system. In one embodiment, the system and/or engine can include a menu engine 108 configured to accept user input 102, specifying any search criteria. The menu engine 108 is configured to search a food or beverage item database (not shown) to return images of the food or beverage items in the database. The menu engine can be configured to search based on food or beverage type, supplier (e.g., vendor), or any other food or beverage item characteristic. The menu engine can be configured to tailor the returned results, and tailor a display of the returned results (e.g., 106A) based on the returned results themselves, based on the vendors associated with the returned results, and/or based on the user entering the search terms. For example, the ordering user can have an associated user profile specifying preferences for food or beverage providers (e.g., minimum rating, price range, distance from user, etc.). In some examples, the user profile can include preference information for delivery (e.g., no motor vehicle deliveries, take-out, not from a specific delivery service, delivery service must have minimum rating, etc.). In some examples, provider profile information can limit matching results (e.g., minimum delivery, price, organic, local, take-out, maximum delivery radius, minimum user rating, hours of operations, dine in only, etc.) and the menu engine can optimize the display of any results.

According to some embodiments, the system 100 and/or management engine 104 can include further components specially configured to optimize displays of food or beverage item images within search results and/or create custom visual menus responsive to search inputs and optionally profile information. For example, the system and/or engine can include a display engine 110 configured to determine if the searching user has input any rating or reviews associated with the returned results and/or vendors associated with the returned results. The display engine can be configured to execute display rules that analyze the review input by the searching user (e.g., free text input—"never eat here" can trigger exclusion of the vendor from the searching users returned results). In other examples, ratings associated with the searching user can be used by the system to elevate presentation of the images of the food or beverage items that are associated with reviews in the result display. The display rules executed by the display engine can be further used to generate a display order for the food or beverage items and/or restaurants/vendors having reviews. In further embodiments, users can see customized displays of items (e.g., food or beverages), restaurants, and/or vendors, wherein the displays elements are arranged based on having reviews or associated ratings. In some embodiments, custom visual selections can be generated organizing the results into sectioned displays. The system can provide descriptive information associated with the display sections. In one example, the display sections can specify "Matching Vendors with Reviews" and "Unreviewed Matching Vendors." The display rules can also analyze any review entered for a food or beverage item and/or vendor to customize the displayed results. In further examples, the display rules can analyze reviews of users associated with the searching user, and modify display precedence and/or customize the visual displays based on reviews entered by users associated with the searching user. In further embodiments, any of the displays/display rules that can be executed on the system to provide ordering functions can also be executed by the system to provider reservation functions. In some embodiments, the system can even schedule successive reservations across a plurality of providers. For example, the system can generate reservations at a series of food providers, one for the entrée, one for dessert, and yet another for drinks. The system can coordinate such reservations, and even, in some examples coordinate transportation between providers. The displays generated by the system can be configured to coordination any order and/or reservation request and tailor the functions according to any preference/search criteria provided.

According to one embodiment, the searching user can then enter selection of the display items (e.g., as user input 102). In some examples, the system and/or management engine 104 can include an ordering engine 112 configured to aggregate user's selections in the display into an executable order. In one example, the ordering engine 112 can be configured to manage ordering with multiple providers (e.g., vendors) and manage payment by the users and distribute any payment to the participating vendors. Additionally, the ordering engine 112 can also be configured to manage the delivery of the food or beverage items and trigger either a delivery option provided by the vendor, or invoke a delivery option provided by the system to service any number of vendors. Additionally, the system can enable delivery services to subscribe to the system and register to become validated delivers. The system can be configured to select from validated delivers automatically or provide delivery options to the user for selection.

According to some embodiments, the ordering engine 112 is configured to identify vendors who do not have any delivery or take-out option, and/or who have not subscribed with a delivery or take-out option (either provided by the system or otherwise) and will prevent orders that incorporate both delivery or take-out and dine in only vendors.

According to various embodiments, the ordering engine 112 can be configured to manage payment and collection from ordering users. In some embodiments, the ordering engine 112 can be configured to calculate retail pricing for any food and/or beverage being ordered and automatically trigger payment collection so that neither the delivery personnel nor the ordering users needs to exchange cash as part of the transaction. In further embodiments, the ordering engine 112 can be configured to automatically include tip as part of the payment processing. In some examples, user can set a tip percentage or maximum tip as part of their user profile. Delivery services can likewise set a minimum tip threshold they require in order to participate in a delivery order.

According to one embodiment, the system 100, management engine 104, and/or ordering engine 112 can be configured to request delivery services from third parties like UBER or other electronic taxi, messenger or bike services. If the system can match a third party transportation provider to an order as it is generated, the system can display the matching options to the ordering customer. In some examples, food or beverage options that would not be displayed can become available based on matching third party delivery options dynamically.

In further embodiments, the ordering engine 112 can be configured to optimize delivery schedules and selection of one or more delivery providers based on user selected order options, users profiles, provider profiles, and/or delivery service profiles. In some examples, the system and/or engine 112 can select multiple delivery services to handle an order from a plurality of providers. In some embodiments, the system may determine that combinations of certain providers and/or delivery services are not possible or are prevented by profile restrictions. If the option is not possible, the system can be configured to gray out or not display food or beverage items associated with the restricted delivery route (s). If the option is prevented by profile restriction, the system and/or ordering engine 112 can be configured to display the option and identify that the option is outside of specified parameters. The entity or vendor specifying the restriction in question can allow the transaction to take place upon confirming the non-compliant option (e.g., exceed a maximum number of delivery orders in one delivery, does not meet a minimum number or price of delivery orders for one delivery, exceeds a maximum distance, etc.).

In some embodiments, the system and/or management engine 104 can also include a networking engine 114. The networking engine 114 can be configured to generate and store association between users of the system. For example, the networking engine 114 can include association rules that define a triggering event and an association type to create between two or more users. For example, the triggering events identified by the networking engine can include any one, two, three, four, five, six, or all of the following: having selected same vendor or menu item, providing rating or feedback, providing rating or feedback on the same food or beverage item, providing rating or feedback on the same vendor, having matching ratings or feedback on any one or more of: food or beverage item; vendor; and food type, connected via a social media site or through other social networking engines, price preferences, proximity of users, and having a matching user status. Other associations can be identified and used to generate connections/associations between two or more users, including order history, matching order parameters (e.g., same combinations of vendors in an order, same food or beverage item in order, same provider, same price preference, same member status, etc.).

In some embodiments, the management engine 104 can be configured to perform the functions and operations discussed with respect to the various components rather than requiring any specific component. As discussed, the management engine 104 and any components can be implemented and the function discussed executed by an ordering system (e.g., 100).

In further embodiments, the system 100 and/or engine 104 can include a rating engine 116 configured to accept a rating or review of any of the system's operations. For example, ordering users can enter ratings or reviews regarding the food they ordered, the restaurant or vendor, the delivery service that delivered the food to their location, etc. According to some embodiments, the system can be configured to process free text inputs from users and define a rating or review associated with any restaurant or vendor, ordered food, delivery personnel, timeliness, etc.

The rating engine 116 can also be configured to accept rating or review information on the customers (e.g., ordering or eat-in users). For example, a provider or vendor can enter rating or review information associated with ordering or eat-in users. User behavior can be recorded/rated through the rating engine 116. For example, a provider can indicate that a user was abusive during eating-in or ordering, combative, confrontational, etc. Alternatively, a provider can note an exceptional customer (e.g., patient, friendly, etc). In some embodiments, provider profiles may specify that the provider only accepts orders from customers without negative feedback, or customers who meet a specified rating level, etc.

In some embodiments, providers can also specify minimum rating and/or review requirements for delivery personnel. Delivery services/personnel can be excluded by the system in response to analyzing rating and/or review information provided by customer and/or providers. According to some embodiments, the rating engine 116 is configured to be accessible to any participant in the viewing, ordering/delivery process, or reservation process. In some examples, delivery personnel can rate/review customers, providers or vendors, as well as be rated/reviewed by respective customers/users and providers/vendors. In some implementations the rating engine is fully accessible to any participant in the system. Food providers, delivery personnel, and customers may each rate their experience with each other providing rich feedback information that is used by the system to tailor subsequent experiences and subscriptions, to analyze against profile information, and/or any specified restrictions or criteria.

Various embodiments may analyze the feedback information provided to optimize visual menus displays. For example, associated user feedback can be weighted by the system to have a greater affect on display optimization. Feedback can be used to establish associations between user having similar opinions, experiences, and/or ordering history. The tailoring of the visual menu displays can also be tailored based on the environment in which the system operates.

Figure 2:
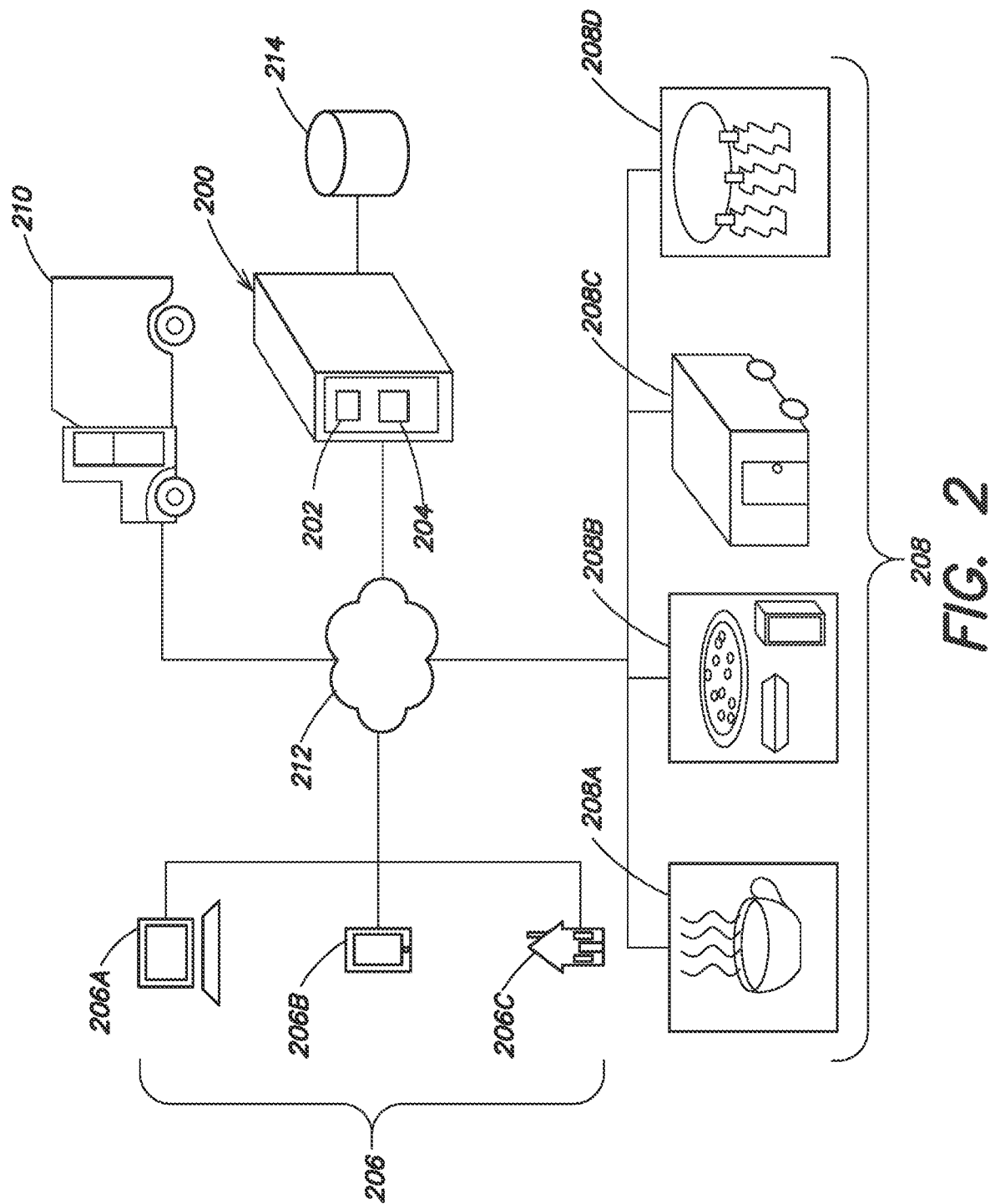
FIG. 2 is a block diagram of an example environmental for a viewing and/or ordering system.

Shown in FIG. 2 is another embodiment of an ordering system 200 and an example environment. The ordering system 200 can be configured to execute a management engine (e.g., 104) or perform the operations discussed above with respect to the management engine (e.g., 104) and any associated components (e.g., 108-112).

According to one embodiment, system 200 includes a management engine 202 configured to communicate with users (e.g., 206), providers (e.g., 208), and optionally delivery services (e.g., 210) over network 212. Network 212 can include a variety of network architectures, LAN, WAN, MAN, and can include, for example, connections to the Internet as well as local, cellular, private, and/or secure connections.

According to one example, end users can access the system 200 via network 212 using their respective computing devices (including for example, mobile devices 206B, personal computers 206A, or any computing device at a delivery location 206C). In some examples, the system can include a voice interpreter to capture audio based orders entered via computer or phone, and translate the audio based order into an execution format for the system 200. The end user can search a food or beverage item database (e.g., 214) and review images associated with food or beverage items returned by search inputs. The food or beverage item database (e.g., 214) includes a multitude of food or beverage items, descriptive information, and associated images. The system enables users to select food or beverage options from a plurality of providers (including, for example, 208A, 208B, 208C, and 208D).

According to some embodiments, any number of providers (e.g., vendors) can subscribe to the system 200 and make any food or beverage options available to end users that they are willing to provide. In some implementations, an ordering system (e.g., 200) can include a subscription component (e.g., 204) which can be included and/or executed by a management engine (e.g., 202). The subscription component is configured to create user accounts for subscribers (e.g., the providers) and capture information on the respective provider's offerings (e.g., food or beverage items, food/beverage type, pricing, additional charges if any, etc.) and services (e.g., dine in only, delivery options, walk-ins welcome, reservations, reservations not accepted, etc.). The subscription component 204 is further configured to manage a provider profile for each provider account. The provider profile can include any description information associated with the provider (e.g., food type, price, ratings, reviews, awards, hours, etc.). The provider can edit and/or manage their own profile through their user account. In further embodiments, respective providers can manage their profile information to ensure the information remains up-to-date.

According to one example, the provider accesses the system 200 and uses the functionality provided by subscription component 204 to capture images of food or beverage items being offered, as well as entering descriptive information regarding the food or beverage item (e.g., food or beverage type, location, beverage type, food name, related dish, delivery options, pick-up options, eat-in options, price, vegetarian, vegan, pescatarian, gluten free, lactose-free, nut free, ethnicity, kosher, gluten free, grain free, shellfish free, any minimum order requirement, among other options). In some implementations, the system can include image intelligence, and the system can analyze images of prepared dishes to automatically populate descriptive information responsive to an uploaded image of the food or beverage item. In some examples, the system can present such automatically derived descriptive information to the provider to approve and/or input additional information (e.g., gluten free, nut-free, price, etc.).

In other embodiments, the system can be configured to evaluate images generated for food or beverage items to ensure quality of the image (e.g., minimum resolution of photo). In some examples, image analysis can be performed to ensure the images is not blurry, has good lighting, is sized according to a standard format, among other options. According to some aspects, the standardization of the imaging format facilitates customer review and improves expectations of the customer regarding the food or beverage items being ordered. In additional embodiments, profession style photos may be required by the system in order to create a food listing. In some examples, the system may specify different photo quality levels of the images of food or beverage items. In some embodiments, quality levels may be based on the quality rating of the provider (e.g., five star restaurant requires professional images and a recent photo (e.g., within a few hours or on the same day as the offering) versus unrated or take-out only establishments (e.g., mobile photo sufficient taken with a few days of the offering being displayed). In other embodiments, the quality levels are implemented on the system to ensure consistency between providers.

According to another embodiment, the subscription component 204 can be further configured to manage registration of delivery providers. For example, delivery providers can specify delivery areas, expected delivery time for one or more delivery radiuses in their delivery area, associated charges to add to a food order, etc. Delivery providers can also specific restrictions on delivery request through a delivery profile. The delivery profile can specify hours of operation, restrictions on delivery areas based on time, restriction on delivery locations based on customer information (e.g., minimum customer rating, no "abusive" feedback, etc.), different delivery time estimates based on time of day (e.g., rush hour delivery estimates increase, etc.). Additionally, the system can monitor delivery operations by any delivery provider and associate actual delivery times to the estimates provided, and the system can use historical information and estimate information to select from various delivery providers. According to further embodiments, the system can determine delivery time estimates based on distance, map location, traffic patterns, etc. In some examples, the system can query traffic applications and/or traffic systems and access transportation time estimates between locations from time estimates provided by third party services.

In some embodiments, the subscription component 204 can include a profile engine configured to capture information on system participants. The profile engine can build user profiles on any participant detailing interactions with the system. In some examples, the profile engine can be configured to accept user specification of information as well as capturing activity information. In some examples, activity can be captured using cookies or other tracking media.

In other examples, delivery providers can also specify a minimum tip amount and/or minimum tip percentage that upon approval is automatically added to an order price with payment managed by the ordering system. In various embodiments, the system is configured to manage an entirely cashless process, where all payment functions are automatic at the completion of delivery.

Figure 3:
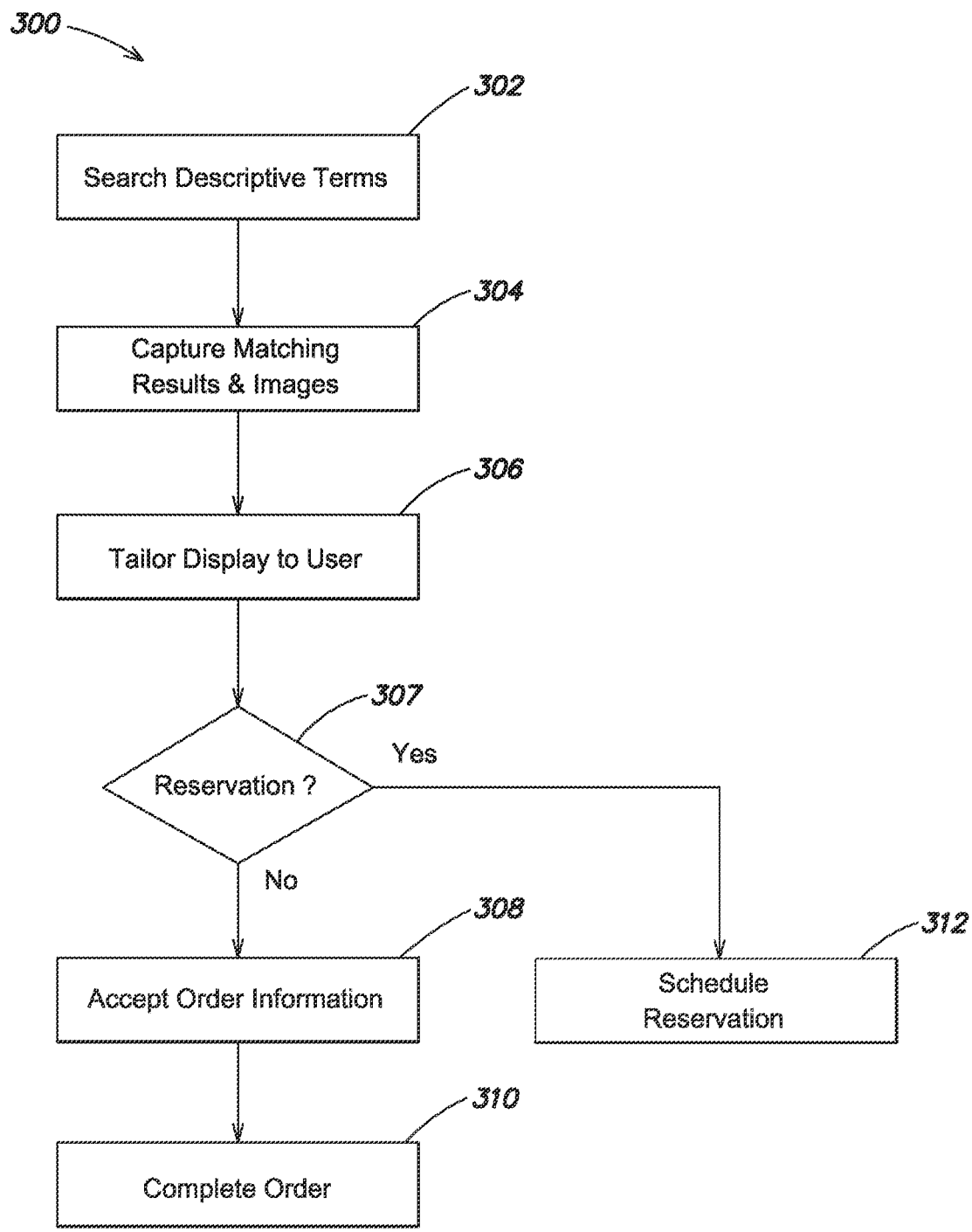
FIG. 3 is a flow diagram illustrating a process for displaying an image based menu.

As discussed, a management engine and/or ordering system can be configured to execute a variety of processes to implement ordering or reservation services across any number of providers. FIG. 3 illustrates an example process flow 300 for ordering or generating reservations associated with one or more providers or one or more food or beverage items. The process 300 begins at 302 with processing of search terms specifying descriptive information for a food based order or reservation. As discussed users can enter free text input for food or beverage characteristics. In some embodiments, processing of search terms can include natural language processing to identify relevant food or beverage characteristics on which to search from a user's free text input. Descriptive information regarding the food or beverage item can include any number of options. For example, a food or restaurant or vendor type (e.g., Indian, Pub, Chinese, Sushi, Food Truck, etc.) can be specified to return results from a number of providers. In other examples, search inputs can specify specific dishes (e.g., lobster thermidor, shrimp fra diavolo, specialty creations, etc.).

Once matching results are identified (e.g., step 304), visual menus can be tailored to the user based on the available providers, available food or beverage options, and/or based on user preferences at 306. Users can scan through any number of images of food or beverage items, selecting various images to create a food/beverage order. Users can input additional search terms, select food or beverage categories, etc., to narrow the display of results. Additional examples of inputs can include one or more of: location, beverage type, food name, related dish, delivery options, pick-up options, eat-in options, price, organic, local, vegetarian, vegan, pescatarian, gluten free, lactose-free, nut free, ethnicity, kosher, gluten free, grain free, shellfish free, and any minimum order requirement, among other options.

At 307, it is determined if the searching user is requesting a reservation or not. If not, 307NO, at 308, order information is accepted to build a customer food or beverage order. According to some examples, as user select one or more options from the display, some remaining options in the display of results can be removed or "grayed out" to prevent selection. For example, if a food or beverage item has been selected with delivery options, providers and associated food or beverage options having eat-in only restrictions can be removed from the displayed list of options. In other examples, an ordering system can maintain expected delivery times for providers, and manage the display of food or beverage results accordingly. For example, images of the food or beverage items resulting from search inputs can be grouped according to delivery time. In further examples, selection within one of the delivery time windows can be configured to gray out other delivery time groupings.

According to same embodiments, delivery time grouping can be made based on a plurality of delivery providers, and the system can optimize delivery selection to ensure that the largest number of options are displayed in each grouping.

Once all order information from a user has been accepted at 308, a complete order can be displayed to a user. Once the user confirms the order information, the actual completion of the order can take place at 310. For example, to complete the order the order is delivered to any provider associated with the ordered food or beverage items. If delivery has been selected, delivery and preparation of the food or beverage items is scheduled. In other examples, if the user wishes to make a reservation (e.g., 307YES) a reservation can be scheduled and a food/beverage order submitted to the kitchen to synchronize arrival of the patron, a settling time period, and presentation of the ordered food/beverage to the table at 312. In further examples, the reservation can be scheduled at 312 and an order identified to the provider.

Figure 4A:
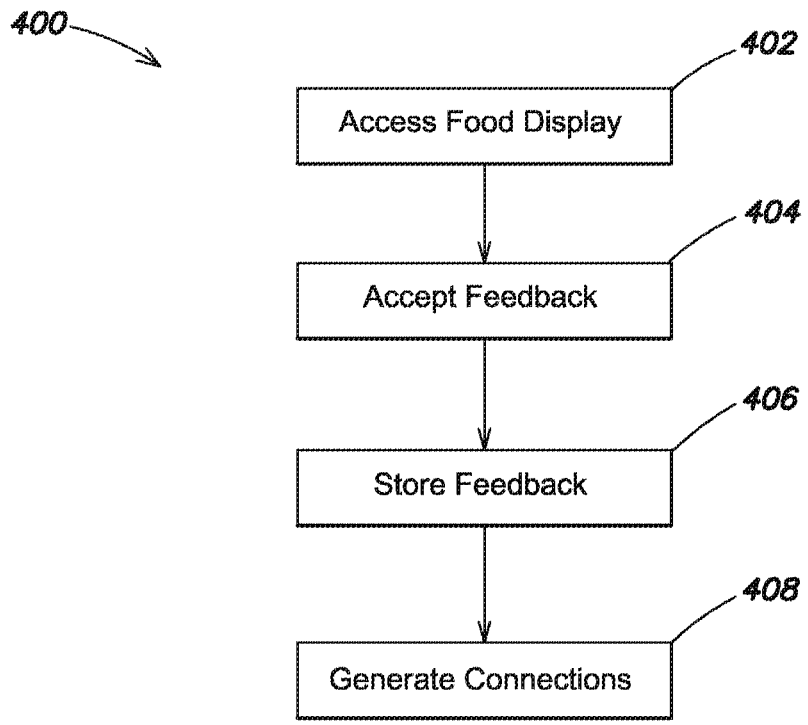
FIG. 4A is a flow diagram illustrating a process for submitting feedback.

Further processes can be executed by, for example, an ordering system once a dining experience is complete. For example, FIG. 4A illustrates a process 400 for receiving user feedback. Any user can access the display of food/beverage images and select a provide feedback or "rate this" option in the display. For example, process 400 can begin with a user accessing a set of images of food/beverage options, or in other examples a display of previous orders associated with a user at 402. At 404, the user is given the option of providing rating information (e.g., 1 to 10, selected number of stars, etc.) and the user feedback is accepted and stored. In other options, the user can enter free text input and the system can extract relevant feedback or rating information based on natural language processing algorithms at 404. Any feedback associated with a particular food or beverage item, a particular provider, delivery experience, etc. can be accepted at 404 and stored at 406. Optionally, process 400 can include operations to identify and generate connections between users based, for example, on the rating or feedback provided, same restaurant or vendor experience, same price preference, etc. In other examples, users can provide information on their social networks and the system can automatically import information on user connections to generate connections.

In further embodiments, social or other connections can be used to recommend food or beverage options, providers, etc., that may be of interest to a respective user. Historic ordering, for example, of the same dish, price, a number of orders from the same provider, etc., can be used by the system to identify and generate a connection between users. In further embodiments, an ordering system can match any viewing, feedback, and/or ordering or reservation activity between users of the system. In some embodiments, modeling of user behavior can be used to match on multiple criteria (e.g., food or beverage type most often orders, same/similar food or beverage ordered consistently, multiple matches in food or beverage type, dish, one or more providers, etc.) to generate connections and/or to generate connections with connection strength evaluations. In some examples, connections and connection strength ratings can be used to tailor viewing displays to respective users.

Figure 4B:
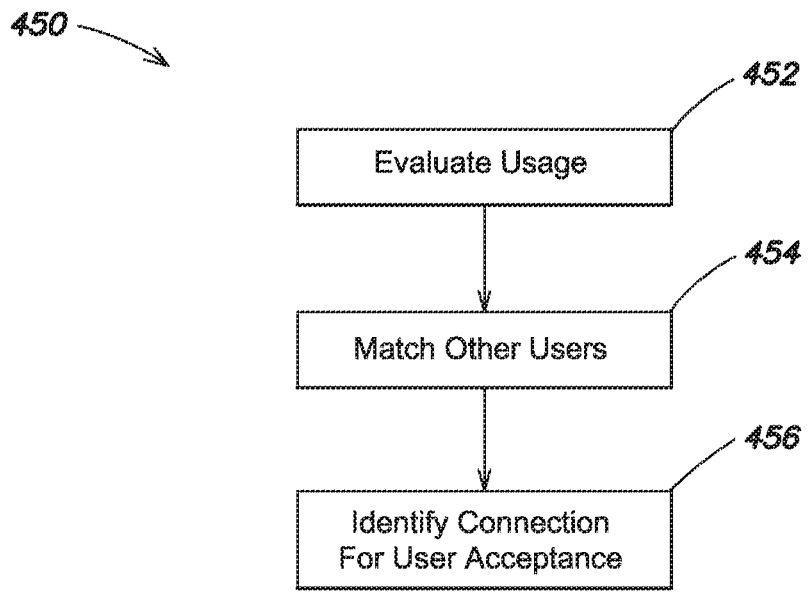
FIG. 4B is a flow diagram illustrating a process for generating connections between users and generating user evaluations.

FIG. 4B illustrates and example process flow for generating connections between users. Process 450 begins at 452 with evaluation of usage data. In some embodiment, any ordering/viewing activity can be captured and stored, for example, in association with a user profile. The usage data can be evaluated to identify identical or similar activity. Responsive, to identification of identical or similar activity, various users can be match at 454. Optionally, process 450 can include a user confirmation step, where a generated connection is presented to a user for confirmation (e.g., 456) before the connection and associated information is used to provide recommendations. In other embodiments, confirmation is not required and ordering/viewing/reservation menus can be tailored to a searching user based on any one or more of: their historical information, defined preferences, and/or based on information associated with connected users. In some examples, the food, beverage, dessert, etc., display within the menus can also be tailored to the searching user based on any one or more of: their historical information, defined preferences, and/or based on information associated with connected users.

Figure 5:
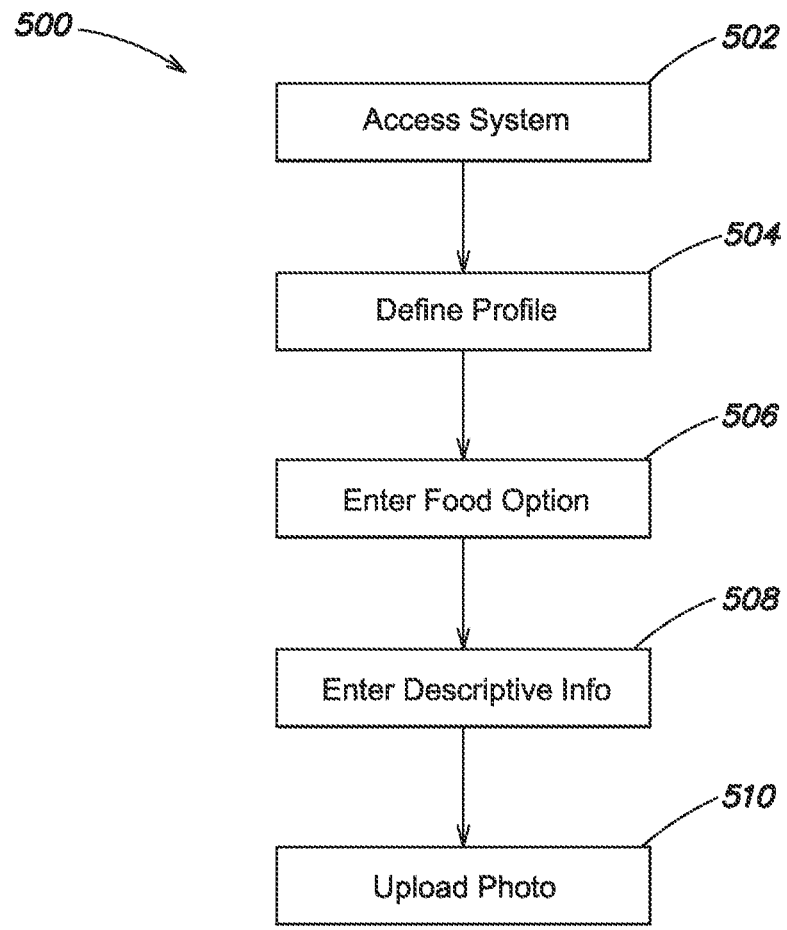
FIG. 5 is a flow diagram illustrating a process for submitting a food item.

According to some implementations, other processes can also be executed in addition to the ordering/viewing protocols discussed above. FIG. 5 illustrates an example process 500 for adding subscribers and/or food or beverage items. Process 500 begins at 502 with accessing an ordering system. A food/beverage service provider can access a viewing or ordering system at 502 and create a provider profile to subscribe to the viewing/ordering system. Defining the provider profile at 504 can include specifying details about the provider, including, for example, location, location photos, hours, delivery options, take-out options, dine-in options, ordering restriction (e.g., minimum order, location, distance, cash or cash equivalent only, etc.), keywords relating to vendor (e.g. breakfast, lunch, dinner, kid friendly, full bar, Michelin star, prefix, etc). Further profile information can include approximate preparation times, food or beverage item specific preparation times, contact information, rating information (e.g., Zagat rating), award information (e.g., Michelin award). Once a provider has completed a provider profile, the provider can begin to input food or beverage options to be made available through the system at 506.

In some embodiments, the provider enters descriptive information for the food or beverage item at 508. The provider can specify food or beverage type, food or beverage category, flavor, spicy, pricing, main ingredient(s), availability information, including, for example, any limits on availability, number of food or beverage items available, etc. Further information can include, good pairings with the food option (e.g., side dishes and/or beverages), among other options. In preparing a food or beverage listing for viewing or sale, delivery, etc., the provider can be required to upload a photo of a prepared dish or beverage (e.g., at 510). In various embodiments, a photograph of the prepared dish or beverage is the vehicle by which users view and/or select food or beverage to order, thus a photo of the food or beverage options can be made a requirement. In some embodiments, subscription to the service can include delivery of imaging hardware for capturing pictures of food or beverage items as they are prepared. In other embodiments, the system can be configured to evaluate images generated for food or beverage items to ensure quality of the image (e.g., minimum resolution of photo). In some examples, image analysis can be performed to ensure the images is not blurry, has good lighting, is sized according to a standard format, among other options.

In other embodiments, steps 506-510 can also be facilitated via image processing, such that a provider can upload a photograph of the food or beverage item and various characteristics of that item can be automatically identified via image processing. In some embodiments, the process 500 can be executed multiple times to build a database of food or beverage items for viewing or ordering for a plurality of providers.

According to some aspects, the process 500 can be executed to ensure timeliness of the images of food or beverage items presented to users. For example, images can be captured with time stamps, and process 500 can optionally require new images once a photo's timeliness has expired. In some implementations, new photos may be required on a daily basis. Other time periods can be enforced automatically on a viewing/ordering system.

According to some embodiments, professional photographs may be required by the system. Professional photographs can ensure consistency and standardization of images across providers and/or food type.

According to another aspect, any food or beverage item stored on the system and/or food or beverage ingredients associated with food or beverage items can also be associated with dietary profiles. In some embodiments, dietary profile information can be required by the system before a food or beverage offering is displayed for viewing or sale. For example, the system can require information on common allergens that may be present in a food or beverage item. Common food allergens include, for example, milk, eggs, fish (e.g., bass, flounder, and cod), crustacean shellfish (e.g. crab, lobster, and shrimp), tree nuts (e.g., almonds, walnuts, and pecans), peanuts, wheat, and soybeans, among other examples. Various ingredients can be stored on the system with associations to known allergens, such that the system can automatically flag a food or beverage item for a potential allergy concern responsive to input of ingredient information. In some embodiments, the system can be configured to prevent listing of a food or beverage item, if allergen information has not been submitted. For example, the system can display warning messages requesting allergen information, etc.

In further embodiments, the system can provide visual menus that are configured to group allergen containing foods or beverages based on respective allergens. Warning messages can be displayed by the system to users as they browse food/beverage selections, view food or beverage items, add items to orders, etc.

Social Reservation Examples

According to one aspect, the system (e.g., 100) can be configured to facilitate creation and management of social events. The system can be configured to manage reservations with service provider locations for any number of attendees. For example, any restaurant or other provider subscribing to the system that accepts reservations can be engaged as a location for a social event generated through the ordering system. According to some embodiments, the system is configured to provide user interfaces that facilitate definition of an event, definition of invitees to the event (e.g., within a user network or outside of the user's network), and manage acceptance of the invitations. In further examples, the system can manage and/or display confirmation of confirmed or booked locations. The system can also manage and/or display confirmed invitees. In further examples, the system can also be configured to facilitate and manage promotional events by providers. For example, the system can deliver invitations to a provider network. The provider network can be generated by the system, for example, based on users who have ordered from the provider.

According to one embodiment, the engine 112 can be configured to manage event definition, deliver invitations, maintain status on participants (e.g., confirmed, declined, tentative or maybe, among other options), and further maintain status on a location for the event. In another embodiment, the system can further comprise an event engine configured to accept use definition of event parameters such as event confirmation deadline, manage participants, and/or locations. The event engine can be configured to execute any of the functions discussed herein associated with event.

In some embodiments, an ordering system can facilitate customized food orders for each participant for an event. The participants can access the provider location through the event invitation, select from visual menu options, and order meals, drinks, etc., prior to the actual event. In some embodiments, the organizer of the event can define event restrictions and customized food, drink, etc., choices can be presented to the event participants based on the restrictions According to another embodiment, the system provides for event definition through mobile applications and user interfaces presented on a mobile device (e.g., a smart phone, tablet, or other portable computing device). In one embodiment, a user can trigger event definition on the system through their mobile device. The user can be identified as an event organizer. The event organizer is given permission to define lists of invitees for the event, and manage selection of a location for the event to take place. The system can enable providers to specify limits on events that the provider will host. The specified limits can include, for example, a number of participants, timing of events, food options available for events, among other options.

Additionally, providers can also specify that event request must be accepted by the provider before a booking is confirmed. In other examples, providers can specify acceptance criteria, as well as availability status, so that only providers ready to accept an event request are displayed to the organizer in the user interface. Some providers can enable an automatic acceptance feature on the system, and in response to event definition by the organizer the system automatically books the event location based on a determination that the event definition meets the automatic acceptance criteria.

Figure 7:
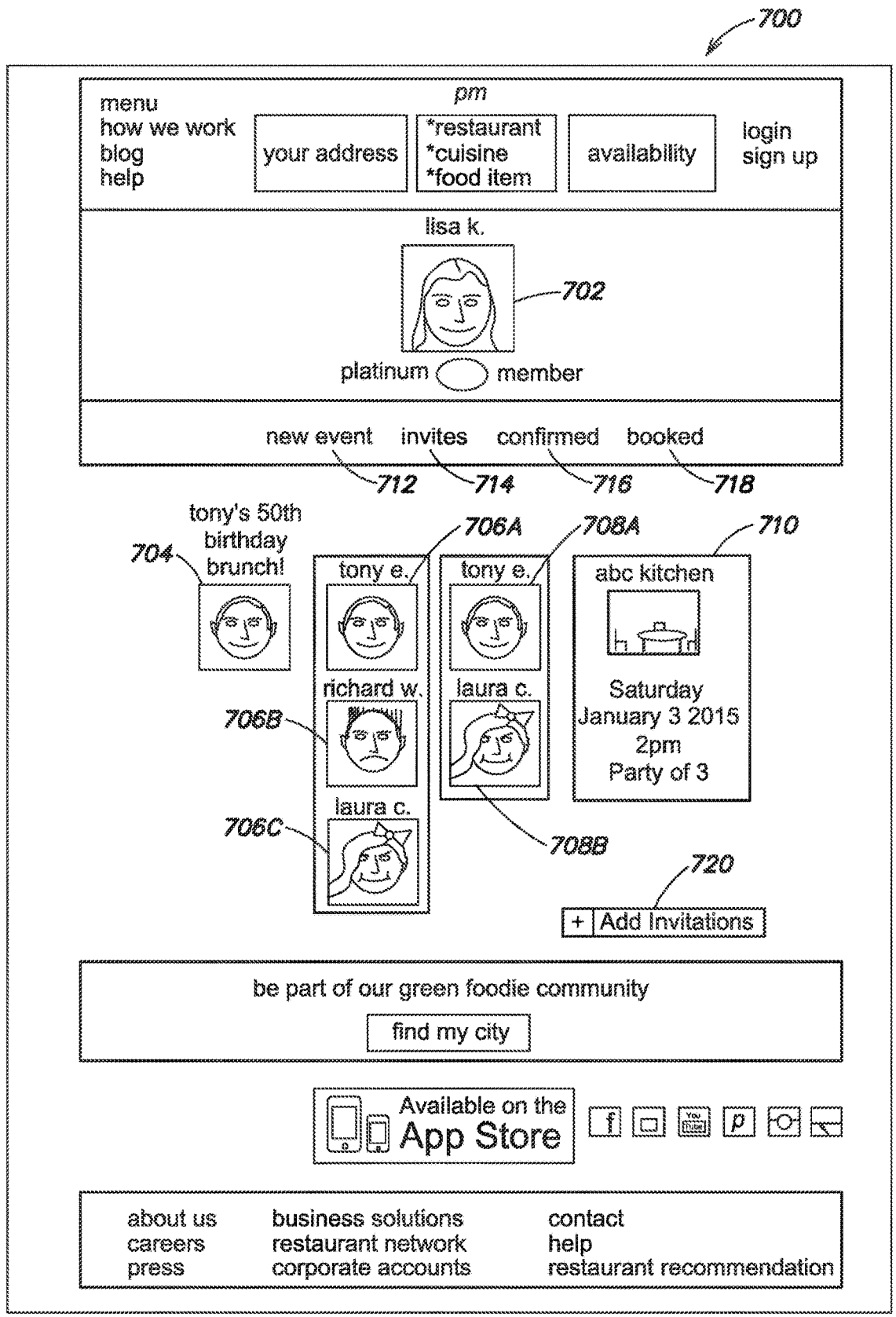
FIG. 7 illustrates an example screen capture of a user interface, according to one embodiment.

FIG. 7 illustrates an example screen capture of a user interface 700 presented to a user of the system. The user interface ("UI") 700 display status information associated with a defined event. For example, UI 700 displays an image of the event organizer at 702 "Lisa K.", and an image associated with the defined event at 704. Status information for each display can also be provided in the UI 700. For example, at 712 the event status "new event" can be shown, as well as information specifying invitees 706A-C at 714, and those invitees who have confirmed attendance 708A and 708B can be displayed at 716. Status information can also be displayed for a requested or booked location 710 at 718. The display of the location at 710 can include the date, time, and other information associated with the event (e.g., party of 3, vendor, etc.). In other examples, lists of invitees who cannot attend can also be shown in the user interface. In one example, the UI 700 can include a display that enables the organizer to access lists of invitees who have declined the invitation. According to some embodiments, the UI 700 can include addition functions. For example, an invitations display 720 can be displayed in UI 700. Upon selection, a user can select people from their network to add to the event, input e-mail addresses, or phone numbers for text messages of people outside their network or who do not subscribe to the system.

In some embodiments, the system can be configured to import people from other social networking sites, e-mail service, phone service, or other on-line networking tools. Any of these contacts can be selected and delivered an invitation by the system. In other embodiment, additional functions can be presented in other user interfaces. For example, an event management UI can include editing functions that permit the user to reselect a location for an event, change the event time, revoke invitation, add invitations, etc. In other user interfaces a user can determine availability of a selected location, availability of invited users, among other options. In some embodiments, the system is configured to accept selection of a primary location and selection of one or more alternate locations. The system can manage requests to the locations and further manage notifications to the user regarding their attempt to book a location.

According to another aspect, the system can include specialized components for executing the functions and operations associated with social reservations. In one embodiments, the system includes a networking subsystem for managing the operations, and executing any of the disclosed functions discussed above and, for example, with respect to social reservation/event management.

Figure 8:
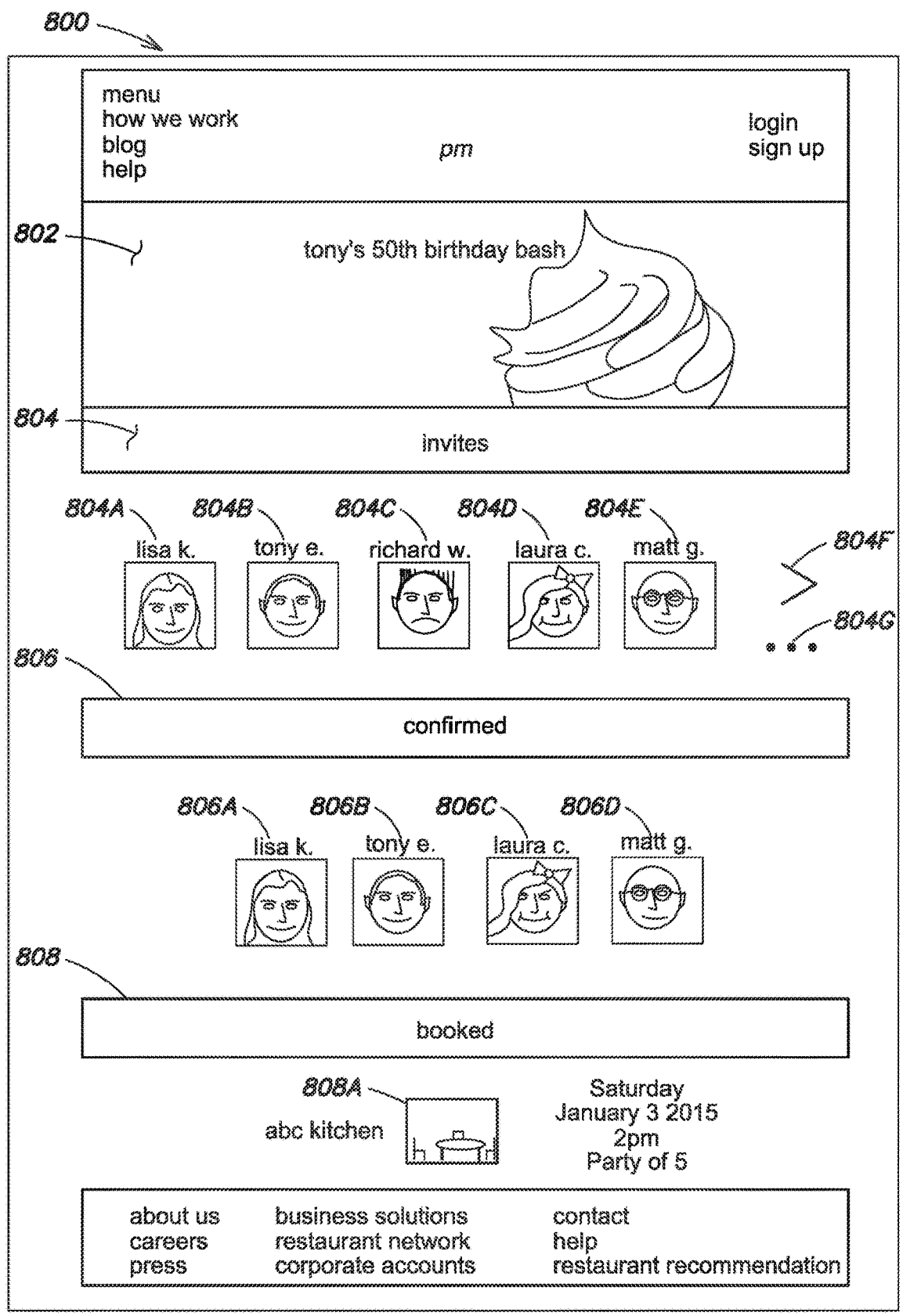
FIG. 8 illustrates an example screen capture of a user interface, according to one embodiment.

FIG. 8 illustrates another example screen capture of a user interface ("UI") 800 presented to a user accessing the networking subsystem. The UI 800 includes an image 802 associated with a defined event. The UI presents images of the users invited to the events at 804 (e.g., "lisa k." at 804A, "tony e." at 804B, "richard w." at 804C, "laura c." at 804D, "matt g." at 804E), and if additional users have been invited the UI 800 can be configured to display a icon 804F,-804G, etc. for accessing displays of additional users. In some embodiments, the users associated with an event can be displayed based on status groups "invites" at 804 and "confirmed" at 806 (including, for example, the user shown at 806A-D). In other embodiments, a location, provider, or restaurant associated with the event can also be display in UI 800. For example, at 808, information for a selected location can be displayed in conjunction with status information associated with the location (e.g., "booked" or "requested" or "awaiting confirmation," among other options). In another example, an image of the location can be displayed at 808A along with information specifying some details associated with the event (e.g., "Saturday, Jan. 3, 2015 2 pm, Party of 5, vendor information, among other options).

According to some embodiments, networking subsystem can implement any number of user interfaces that enable management and execution of special events. In some examples, the system is configured to enable surprise events—sending customized invitation to some participants configured to conceal the actual nature of the event from another user receiving the invitation.

Various embodiments, enable service providers to accept booking for special events. In some embodiments, the event can include reservation dining areas a specific location. In other embodiment, service providers can be engaged to cater special events at locations specified on the system. In yet other embodiment, the system can manage transportation for invitees to an event location (e.g., scheduling UBER pickup and/or deliveries, request delivery service to transport invitees, among other options). Described above are examples of user interfaces and examples of functions that can be implemented by a networking subsystem to facilitate event definition and execution. Other embodiments can implement additional features to facilitate management, combine features, and/or provide subsets of the features offered.

In some implementations, a user can be associated with membership levels and event definition functions limited to user having a specific membership level. In other embodiments, certain providers may specify a membership level as pre-requisite to booking a location for an event. In still others, some providers can specify that a deposit (e.g., of a certain amount) is required before booking their location for an event. Other embodiments implement additional details and the examples provided should b read as limiting.

Example Computer System

As discussed above with regard to FIG. 1, various aspects and functions described herein may be implemented as specialized hardware or software components executing in one or more special purpose computer systems. Examples of special purpose computer systems that may be modified to include the engines, components, and functionality discussed may include mobile computing devices, such as cellular phones and personal digital assistants, smart devices, laptops, notebooks, netbooks, etc. Further, various aspects may be located on a single special purpose computer system (e.g., as an "app") or may be distributed among a plurality of special purpose computer systems connected to one or more communications networks.

For example, various aspects, components, and functions (e.g. ordering engine, menu engine, networking subsystem, reserving, scheduling, delivering food options) may be distributed among one or more special purpose computer systems configured to provide a service to one or more client computers, mobile device, or to perform an overall task as part of a distributed system. Additionally, aspects may be performed on a client-server or multi-tier system that includes components or engines distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 6:
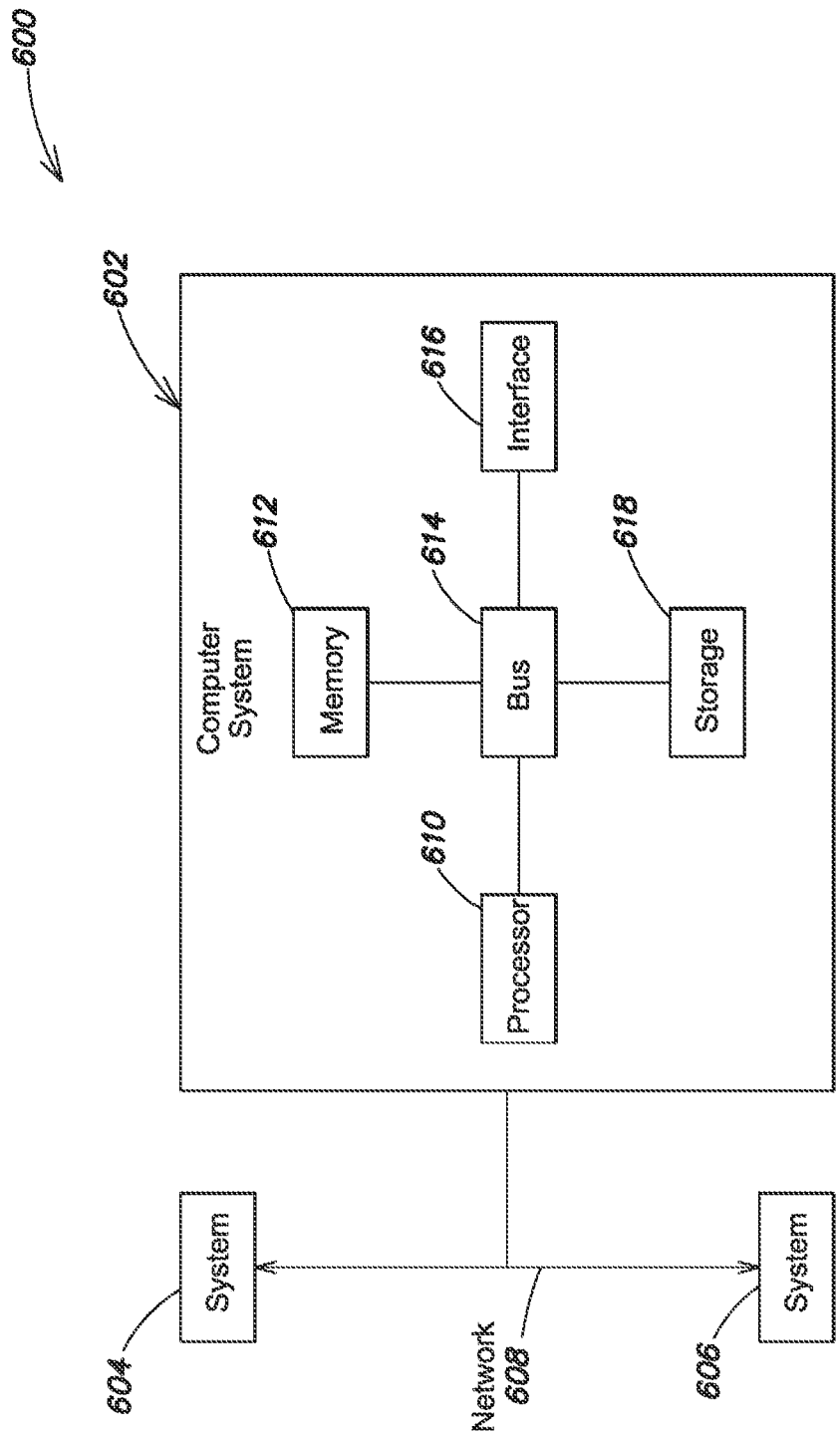
FIG. 6 a schematic diagram of an exemplary computer system that may be specially configured to perform processes and functions disclosed herein.

Referring to FIG. 6, there is illustrated a block diagram of a distributed special purpose computer system 600, in which various aspects and functions are practiced (e.g., including a menu engine, display engine, image component, payment component, networking subsystem, and ordering engine among other options). As shown, the distributed computer system 600 includes one more special purpose computer systems that exchange information. More specifically, the distributed computer system 600 includes computer systems 602, 604 and 606. As shown, the computer systems 602, 604 and 606 are interconnected by, and may exchange data through, a communication network 608. For example, an viewing and/or ordering system and/or management engine can be implemented on 602, which can communicate with other systems, including systems hosted at a provider site (e.g., 604), and systems at customer location or a delivery locations (implemented for examples at 606), the systems can operate together to execute the reservation, ordering and delivery functions as discussed herein.

In some embodiments, the network 608 may include any communication network through which computer systems may exchange data. To exchange data using the network 608, the computer systems 602, 604 and 606 and the network 608 may use various methods, protocols and standards, including, among others, TCP/IP, or other communication standard, and may include secure communication protocols VPN, IPsec, etc. To ensure data transfer is secure, the computer systems 602, 604 and 606 may transmit data via the network 608 using a variety of security measures including, for example, TLS, SSL or VPN or other standard. While the distributed computer system 600 illustrates three networked computer systems, the distributed computer system 600 is not so limited and may include any number of computer systems and computing devices, networked using any medium and communication protocol.

As illustrated in FIG. 6, the special purpose computer system 602 includes a processor 610, a memory 612, a bus 614, an interface 616 and data storage 618 and further includes any one or more of the engines discussed above to implement at least some of the aspects, functions and processes disclosed herein, as either a stand-alone system or part of a distributed system, the processor 610 performs a series of instructions that result in manipulated data. The processor 610 may be any type of processor, multiprocessor or controller. The processor 610 is connected to other system components, including one or more memory devices 612, by the bus 614.

The memory 612 stores programs and data during operation of the computer system 602. Thus, the memory 612 may be a relatively high performance, volatile, random access memory such as a dynamic random access memory (DRAM) or static memory (SRAM) or other standard. However, the memory 612 may include any device for storing data, such as a disk drive, hard drive, or other non-volatile storage device. Various examples may organize the memory 612 into particularized and, in some cases, unique structures to perform the functions disclosed herein. These data structures may be sized and organized to store values for particular data and types of data, and in particular, may include standardize formats for organizing and presenting food or beverage options, and standardize formatting for images associates with each food or beverage option.

Components of the computer system 602 are coupled by an interconnection element such as the bus 614. The bus 614 may include one or more physical busses, for example, busses between components that are integrated within the same machine, but may include any communication coupling between system elements including specialized or standard computing bus technologies such as IDE, SCSI, PCI and InfiniBand or other standard. The bus 614 enables communications, such as data and instructions, to be exchanged between system components of the computer system 602.

The computer system 602 also includes one or more interface devices 616 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 602 to exchange information and to communicate with external entities, such as users, vendors, and other systems.

The data storage 618 includes a computer readable and writeable nonvolatile, or non-transitory, data storage medium in which instructions are stored that define a program or other object that is executed by the processor 610. The data storage 618 also may include information that is recorded, on or in, the medium, and that is processed by the processor 610 during execution of the program. More specifically, the information may be stored in one or more data structures specifically configured to conserve storage space or increase data exchange performance.

The instructions stored in the data storage may be persistently stored as encoded signals, and the instructions may cause the processor 610 to perform any of the functions described herein. The medium may be, for example, optical disk, magnetic disk or flash memory, among other options. In operation, the processor 610 or some other controller causes data to be read from the nonvolatile recording medium into another memory, such as the memory 612, that allows for faster access to the information by the processor 610 than does the storage medium included in the data storage 618. The memory may be located in the data storage 618 or in the memory 612, however, the processor 610 manipulates the data within the memory, and then copies the data to the storage medium associated with the data storage 618 after processing is completed. A variety of components may manage data movement between the storage medium and other memory elements and examples are not limited to particular data management components. Further, examples are not limited to a particular memory system or data storage system.

Although the computer system 602 is shown by way of example as one type of computer system upon which various aspects and functions may be practiced, aspects and functions are not limited to being implemented on the computer system 602 as shown in FIG. 6. Various aspects and functions may be practiced on one or more computers having different architectures or components than that shown in FIG. 6 which can be modified to include the specially purpose engines, components and/or functions discussed. For instance, the computer system 602 may include specially programmed, special-purpose hardware, such as an application-specific integrated circuit (ASIC) tailored to perform a particular operation disclosed herein (e.g., ordering, reserving, scheduling, delivering food options, among other examples). While another example may perform the same function using a grid of several general-purpose computing devices running MAC OS System X with Motorola PowerPC processors and several specialized computing devices running proprietary hardware and operating systems.

The computer system 602 may be a computer system including an operating system that manages at least a portion of the hardware elements included in the computer system 602. Additionally, various aspects and functions may be implemented in a non-programmed environment, for example, documents created in HTML, XML or other format that, when viewed in a window of a browser program, can render aspects of a graphical-user interface or perform other functions. For example, a management component can render an interface in a browser to enable viewing and/or selection of dynamically created visual menus.

Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g., specialized hardware, executable code, data structures or data objects, that are configured to perform the functions described herein.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system comprising:
    at least one processor operatively connected to a memory;
    a menu engine, executed by at least one processor, configured to:
        search descriptive characteristics associated with consumable items for human ingestion provided by a plurality of consumable providers to return results based on user input criteria, wherein the results are filtered images of the consumable items generated responsive to the user input criteria;
    a display engine, executed by the at least one processor, configured to:
        display at least one user interface, wherein the at least one user interface is configured to accept user selection of at least one of the images of the consumable items provided by the plurality of consumable providers;
        aggregate matching consumable items from the plurality of consumable providers;
        tailor a respective image based menu and first display screen shown to the user based on user defined preferences;
        display the respective image based menu representative of consumable offerings available at the plurality of consumable providers, wherein the image based menu includes images of the consumable items representative of the offerings made available by respective consumable providers; and
        wherein the first display includes at least a first display element of a first consumable item from a first consumable provider matching the user input criteria and a second display element of a second consumable item from a second consumable provider matching the user input criteria, wherein each of the first and the second display elements are selectable to create a common order, wherein the common order comprises offerings from multiple consumable providers.

2. The system of claim 1, wherein the display engine is further configured to generate the respective image based menu dynamically responsive to identifying available images of the consumable items meeting display criteria, wherein the display criteria is defined on the system prior to execution of the search.

3. The system according to claim 2, wherein the display engine is further configured to analyze available consumable items and available providers to identify options meeting the display criteria based on display preferences associated with the user retrieved from a user profile.

4. The system of claim 1, further comprising an ordering engine, executed by the at least one processor, configured to request the consumable items associated with the plurality of images from one or more respective providers associated with any selected image.

5. The system of to claim 1, further comprising a payment component configured to:
- manage payment verification associated with the user;
- identify and execute payment distribution between a plurality of providers associated with the common order.

6. The system of claim 1, wherein the at least one processor is further configured to identify a first group of the user's connections to establish at least a portion of the user defined preferences.

7. The system of claim 6, wherein an ordering of the consumable items shown in the image based menu is defined, at least in part, by reviews of respective consumable items associated with the first group.

8. The system of claim 1, further comprising a network engine configured to generate an association between at least two users based on social networking formation.

9. The system of claim 1, wherein the network engine is configured to generate a network of associated users responsive to determining a degree of separation between the at least two users, and the system is configured to update the ordering of the display in the image based menu responsive to analyzing information associated with the network of associated users.

10. The system of claim 1, wherein the consumable items include at least a food item or a beverage item.

11. A computer implemented method for displaying an image based menu, the method comprising:
- searching, by at least one processor, descriptive characteristics associated with consumable items for human ingestion provided by a plurality of consumable providers to return results based on user input criteria, wherein the results are filtered images of the consumable items generated responsive to the user input criteria;
- displaying, by at least one processor, at least one user interface, wherein the at least one user interface is configured to accept user selection of at least one of the images of the consumable items provided by the plurality of consumable providers;
- aggregating, by at least one processor, matching consumable items from the plurality of consumable providers;
- tailoring, by at least one processor, a respective image based menu and first display screen shown to the user based on user defined preferences;
- displaying, by at least one processor, the respective image based menu representative of consumable offerings available at the plurality of consumable providers, wherein the image based menu includes images of the consumable items representative of the offerings made available by respective consumable providers; and
- wherein displaying of the first display includes displaying at least a first display element associated with a first consumable item from a first consumable provider matching the user input criteria and a second display element associated with a second consumable item from a second consumable provider matching the user input criteria, wherein each of the first and the second display elements are selectable to create a common order, wherein the common order comprises offerings from multiple consumable providers.

12. The method of claim 11, further comprising generating the respective image based menu dynamically responsive to identifying available images of the consumable items meeting display criteria, wherein the display criteria is defined on the method prior to execution of the search.

13. The method according to claim 12, further comprising analyzing available consumable items and available providers to identify options meeting the display criteria based on display preferences associated with the user retrieved from a user profile.

14. The method of claim 11, further comprising requesting, by an ordering engine, the consumable items associated with the plurality of images from one or more respective providers associated with any selected image.

15. The method of to claim 11, further comprising:
- managing payment verification associated with the user; and
- identifying and executing payment distribution between a plurality of providers associated with the common order.

16. The method of claim 11, further comprising identifying a first group of the user's connections to establish at least a portion of the user defined preferences.

17. The method of claim 16, further comprising defining an ordering of the consumable items shown in the image based menu based, at least in part, by reviews of respective consumable items associated with the first group.

18. The method of claim 11, further comprising generating an association between at least two users based on social networking formation.

19. The method of claim 11, further comprising generating a network of associated users responsive to determining a degree of separation between the at least two users, and the method is configured to update the ordering of the display in the image based menu responsive to analyzing information associated with the network of associated users.

20. The method of claim 11, wherein the consumable items include at least a food item or a beverage item.

* * * * *